US009189994B2

(12) United States Patent
Iida et al.

(10) Patent No.: US 9,189,994 B2
(45) Date of Patent: Nov. 17, 2015

(54) DISPLAY DEVICE AND ELECTRONIC EQUIPMENT

(71) Applicant: Sony Corporation, Tokyo (JP)

(72) Inventors: Yukihito Iida, Kanagawa (JP); Tetsuo Minami, Tokyo (JP); Takao Tanikame, Kanagawa (JP); Katsuhide Uchino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 16 days.

(21) Appl. No.: 14/067,491

(22) Filed: Oct. 30, 2013

(65) Prior Publication Data

US 2014/0049456 A1 Feb. 20, 2014

Related U.S. Application Data

(63) Continuation of application No. 12/190,366, filed on Aug. 12, 2008.

(30) Foreign Application Priority Data

Aug. 15, 2007 (JP) ................................ 2007-211623

(51) Int. Cl.
*G06F 3/041* (2006.01)
*H04N 7/18* (2006.01)
*G09G 3/32* (2006.01)

(52) U.S. Cl.
CPC ............ *G09G 3/3258* (2013.01); *G09G 3/3233* (2013.01); *G09G 3/3266* (2013.01); *G09G 2300/0819* (2013.01); *G09G 2300/0842* (2013.01); *G09G 2300/0866* (2013.01)

(58) Field of Classification Search
None
See application file for complete search history.

(56) References Cited

U.S. PATENT DOCUMENTS

| | | | | |
|---|---|---|---|---|
| 6,246,384 | B1 | 6/2001 | Sano | |
| 6,456,267 | B1 | 9/2002 | Sato et al. | |
| 6,490,014 | B1 * | 12/2002 | Ohtani et al. | 349/38 |
| 6,507,375 | B1 * | 1/2003 | Kawahata | 349/38 |
| 6,618,029 | B1 | 9/2003 | Ozawa | |
| 7,158,105 | B2 | 1/2007 | Miyazawa | |
| 7,205,965 | B2 | 4/2007 | Mikami et al. | |
| 7,592,983 | B2 * | 9/2009 | Ozawa et al. | 345/76 |
| 7,880,690 | B2 | 2/2011 | Miyazawa | |
| 2001/0024187 | A1 * | 9/2001 | Sato et al. | 345/98 |
| 2002/0190924 | A1 | 12/2002 | Asano et al. | |
| 2004/0222419 | A1 | 11/2004 | Matsui et al. | |
| 2007/0040770 | A1 | 2/2007 | Kim | |

(Continued)

FOREIGN PATENT DOCUMENTS

| | | |
|---|---|---|
| JP | HEI 08-054836 | 2/1996 |
| JP | 2001-109404 | 4/2001 |

(Continued)

OTHER PUBLICATIONS

Japanese Office Action dated Sep. 25, 2012 for related counterpart Japanese Patent Application No. 2007-211623.

*Primary Examiner* — William Boddie
*Assistant Examiner* — Alecia D English
(74) *Attorney, Agent, or Firm* — Dentons US LLP

(57) ABSTRACT

A display device including: a pixel array section; power supply lines; and auxiliary electrodes, wherein each pixel has an auxiliary capacitance, and one of electrodes of the auxiliary capacitance is connected to the source electrode of the drive transistor, and another electrode is connected to the auxiliary electrode for the pixel.

8 Claims, 18 Drawing Sheets

(56) References Cited

U.S. PATENT DOCUMENTS

| | | | |
|---|---|---|---|
| 2007/0063936 | A1 | 3/2007 | Jung et al. |
| 2009/0079495 | A1 | 3/2009 | Morita |

FOREIGN PATENT DOCUMENTS

| | | |
|---|---|---|
| JP | 2001-330856 | 11/2001 |
| JP | 2002-196706 | 7/2002 |
| JP | 2002-318556 | 10/2002 |
| JP | 2003-271095 | 9/2003 |
| JP | 2005-326704 | 11/2005 |
| JP | 2005-345976 | 12/2005 |
| JP | 2006-133542 | 5/2006 |
| JP | 2006-184384 | 7/2006 |
| JP | 2007-10246 | 4/2007 |

* cited by examiner t= BEFORE t1 t=t1 t=t2 t=t3 t=t4 t=t5 t=t6 t=t7 t=t8 t=t9 t=t10

DISPLAY DEVICE AND ELECTRONIC EQUIPMENT

CROSS REFERENCES TO RELATED APPLICATIONS

This application is a continuation of U.S. patent application Ser. No. 12/190,366 filed Aug. 12, 2008, the entirety of which is incorporated herein by reference to the extent permitted by law. The present application also claims priority to Japanese Patent Application JP 2007-211623 filed in the Japan Patent Office on Aug. 15, 2007, the entire contents of which being incorporated herein by reference to the extent permitted by law.

BACKGROUND OF THE INVENTION

1. Field of the Invention

The present invention relates to a display device and electronic equipment, and more particularly to a flat panel display device and electronic equipment having the same in which pixels, each incorporating an electro-optical element, are disposed in a matrix form.

2. Description of the Related Art

In the field of image display device, flat panel display devices having pixels (pixel circuits), each incorporating an electro-optical element, disposed in a matrix form, are rapidly becoming widespread. Among flat panel display devices, the development and commercialization of organic EL display devices using organic EL (Electro Luminescence) elements have been continuing at a steady pace. An organic EL element is a type of current-driven electro-optical element whose light emission brightness changes according to the current flowing through the element. This type of element relies on the phenomenon that an organic thin film emits light when applied with an electric field.

An organic EL display device has the following features. That is, it is low in power consumption because organic EL elements can be driven by a voltage of 10V or less. Besides, organic EL elements are self-luminous. Therefore, an organic EL display device offers higher image visibility as compared to a liquid crystal display device designed to display an image by controlling the light intensity from the light source (backlight) for each of the pixels containing liquid crystal cells. Further, an organic EL display device desires no lighting members such as backlight as desired for a liquid crystal display device, thus making it easier to reduce weight and thickness. Still further, organic EL elements are extremely fast in response speed or several μ seconds or so. This provides a moving image free from afterimage.

An organic EL display device can be either simple (passive)-matrix or active-matrix driven as with a liquid crystal display device. It should be noted, however, that a simple matrix display device has some problems although simple in construction. Such problems include difficulty in implementing a large high-definition display device because the light emission period of the electro-optical elements diminishes with increase in the number of scan lines (i.e., number of pixels).

For this reason, the development of active matrix display devices has been going on at a brisk pace in recent years. Such display devices control the current flowing through the electro-optical element with an active element such as insulating gate field effect transistor (typically, thin film transistor or TFT) provided in the same pixel circuit as the electro-optical element. In an active matrix display device, the electro-optical elements maintain light emission over a frame interval. As a result, a large high-definition display device can be implemented with ease.

Incidentally, the I-V characteristic (current-voltage characteristic) of the organic EL element is typically known to deteriorate over time (so-called deterioration over time). In a pixel circuit using an N-channel TFT as a transistor adapted to current-drive the organic EL element (hereinafter written as “drive transistor”), the organic EL element is connected to the source of the drive transistor. Therefore, if the I-V characteristic of the organic EL element deteriorates over time, a gate-to-source voltage Vgs of the drive transistor changes, thus changing the light emission brightness of the same element.

This will be described more specifically below. The source potential of the drive transistor is determined by the operating point between the drive transistor and organic EL element. If the I-V characteristic of the organic EL element deteriorates, the operating point between the drive transistor and organic EL element will change. As a result, the same voltage applied to the gate of the drive transistor changes the source potential of the drive transistor. This changes the gate-to-source voltage Vgs of the drive transistor, thus changing the current level flowing through the drive transistor. Therefore, the current level flowing through the organic EL element also changes. As a result, the light emission brightness of the organic EL element changes.

In a pixel circuit using a polysilicon TFT, on the other hand, a threshold voltage Vth of the drive transistor or a mobility μ of a semiconductor thin film making up the channel of the drive transistor (hereinafter written as “mobility of the drive transistor”) changes over time or is different from one pixel to another due to the manufacturing process variation (the transistors have different characteristics), in addition to the deterioration of the I-V characteristic over time.

If the threshold voltage Vth or mobility μ of the drive transistor is different from one pixel to another, the current level flowing through the drive transistor varies from one pixel to another. Therefore, the same voltage applied to the gates of the drive transistors leads to a difference in light emission brightness of the organic EL element between the pixels, thus impairing the screen uniformity.

Therefore, the compensation and correction functions are provided in each of the pixels to ensure immunity to deterioration of the I-V characteristic of the organic EL element over time and variation in the threshold voltage Vth or mobility μ of the drive transistor over time, thus maintaining the light emission brightness of the organic EL element constant (refer, for example, to Japanese Patent Laid-Open No. 2006-133542 (hereinafter referred to as Patent Document 1)). The compensation function compensates for the variation in characteristic of the organic EL element. One of the correction functions corrects the variation in the threshold voltage Vth of the drive transistor (hereinafter written as “threshold correction”). Another correction function corrects the variation in the mobility μ of the drive transistor (hereinafter written as “mobility correction”).

SUMMARY OF THE INVENTION

In the related art described in Patent Document 1, the compensation function adapted to compensate for the variation in the characteristic of the organic EL element and the correction functions adapted to correct the variation in the threshold voltage Vth and mobility μ are provided in each of the pixels. This ensures immunity to deterioration of the I-V characteristic of the organic EL element over time and variation in the threshold voltage Vth or mobility μ of the drive transistor over time, thus maintaining the light emission brightness of the organic EL element constant. However, the related art desires a number of elements to make up each pixel, thus causing an impediment to reducing the pixel size and, by extension, providing a higher-definition display device.

On the other hand, a write gain for writing a video signal to the pixel is determined by factors such as the capacitance value of a holding capacitance adapted to hold the written video signal and the capacitive component of the organic EL element (the details thereof will be described later). As display devices grow in definition, the pixel size becomes finer. As a result, the electrodes making up the organic EL element become smaller. Accordingly, the capacitance value of the capacitive component of the organic EL element is smaller, thus resulting in a lower video signal write gain. If the write gain declines, a signal potential appropriate to the video signal may not be held in the holding capacitance. As a result, the light emission brightness appropriate to the video signal level may not be achieved.

In light of the foregoing, it is a purpose of the embodiment of the present invention to provide a display device and electronic equipment having the same, each of whose pixels is made up of fewer components and which can secure a sufficient video signal write gain.

In order to achieve the above desire, the display device according to the embodiment of the present invention is defined in that it includes a pixel array section, power supply lines and auxiliary electrodes. The pixel array section includes pixels arranged in a matrix form. Each of the pixels includes an electro-optical element and write transistor adapted to write a video signal and holding capacitance adapted to hold the video signal written by the write transistor. Each of the pixels further includes a drive transistor adapted to drive the electro-optical element based on the video signal held by the holding capacitance. The power supply lines are disposed one for each of the pixel rows of the pixel array section and in the proximity of the scan line which belongs to the adjacent pixel row. The power supply lines selectively apply a first potential and a second potential lower than the first potential to the drain electrode of the drive transistor. The auxiliary electrodes are disposed in rows, in columns or in a grid form for the pixels of the pixel array section arranged in a matrix form. The auxiliary electrodes are applied with a fixed potential. The pixels each have an auxiliary capacitance. One of the electrodes of the auxiliary capacitance is connected to the source electrode of the drive transistor. The other electrode thereof is connected to the auxiliary electrode for each pixel.

In the display device configured as described above and electronic equipment having the same, the first and second potentials are selectively applied to the drain electrode of the drive transistor via the power supply line. The drive transistor supplied with a current from the power supply line drives the electro-optical element to emit light when supplied with the first potential. The same transistor does not drive the electro-optical element to emit light when supplied with the second potential. As a result, the drive transistor has the capabilities to control the light emission and non-light emission of the same element as well as current-drive the electro-optical element. This eliminates the need for a transistor adapted specifically to control the light emission and non-light emission.

Further, the auxiliary capacitance, one of whose ends is connected to the source electrode of the drive transistor, makes it possible to increase the video signal write gain by the capacitance value of the auxiliary capacitance because the gain is determined by the capacitance values of the capacitive component of the electro-optical element and the holding and auxiliary capacitances. Here, the auxiliary electrodes, which are disposed in rows, in columns or in a grid form for the pixels of the pixel array section arranged in a matrix form and which are applied with a fixed potential, are each connected to one of the electrodes of the auxiliary capacitance for each pixel. This makes it possible to apply a fixed potential to the other electrode of the auxiliary capacitance without providing any cathode wiring in a TFT layer, thus allowing to form the auxiliary capacitance for the fixed potential.

BRIEF DESCRIPTION OF THE DRAWINGS

FIG. 20A is a perspective view as seen from the front, and FIG. 20B is a perspective view as seen from the rear;

FIG. 23A is a front view of the mobile phone in an open position, FIG. 23B is a side view thereof, FIG. 23C is a front view thereof in a closed position, FIG. 23D is a left side view thereof, FIG. 23E is a right side view thereof, FIG. 23F is a top view thereof, and FIG. 23G is a bottom view thereof.

DETAILED DESCRIPTION OF THE PREFERRED EMBODIMENTS

The embodiments of the present invention provide the drive transistor with the capabilities to control the light emission and non-light emission of the same element as well as current-drive the electro-optical element. This makes it possible to make up each pixel with fewer components, i.e., merely the write and drive transistors. At the same time, a sufficient video signal write gain can be secured by providing the auxiliary capacitance in addition to the holding capacitance.

Further, the other electrode of the auxiliary capacitance is connected, for each pixel, to one of the auxiliary electrodes which are disposed in rows, in columns or in a grid form for the pixels of the pixel array section arranged in a matrix form. This makes it possible to apply a fixed potential to the other electrode without providing any cathode wiring in the TFT layer. As a result, the auxiliary capacitance can be formed for the fixed potential while at the same time suppressing the wiring resistance. This suppresses horizontal crosstalk caused by the wiring resistance, thus providing improved on-screen image quality.

A detailed description will be given below of the preferred embodiment of the present invention with reference to the accompanying drawings.

[Display Device as a Prerequisite for the Present Invention]

Figure 1:
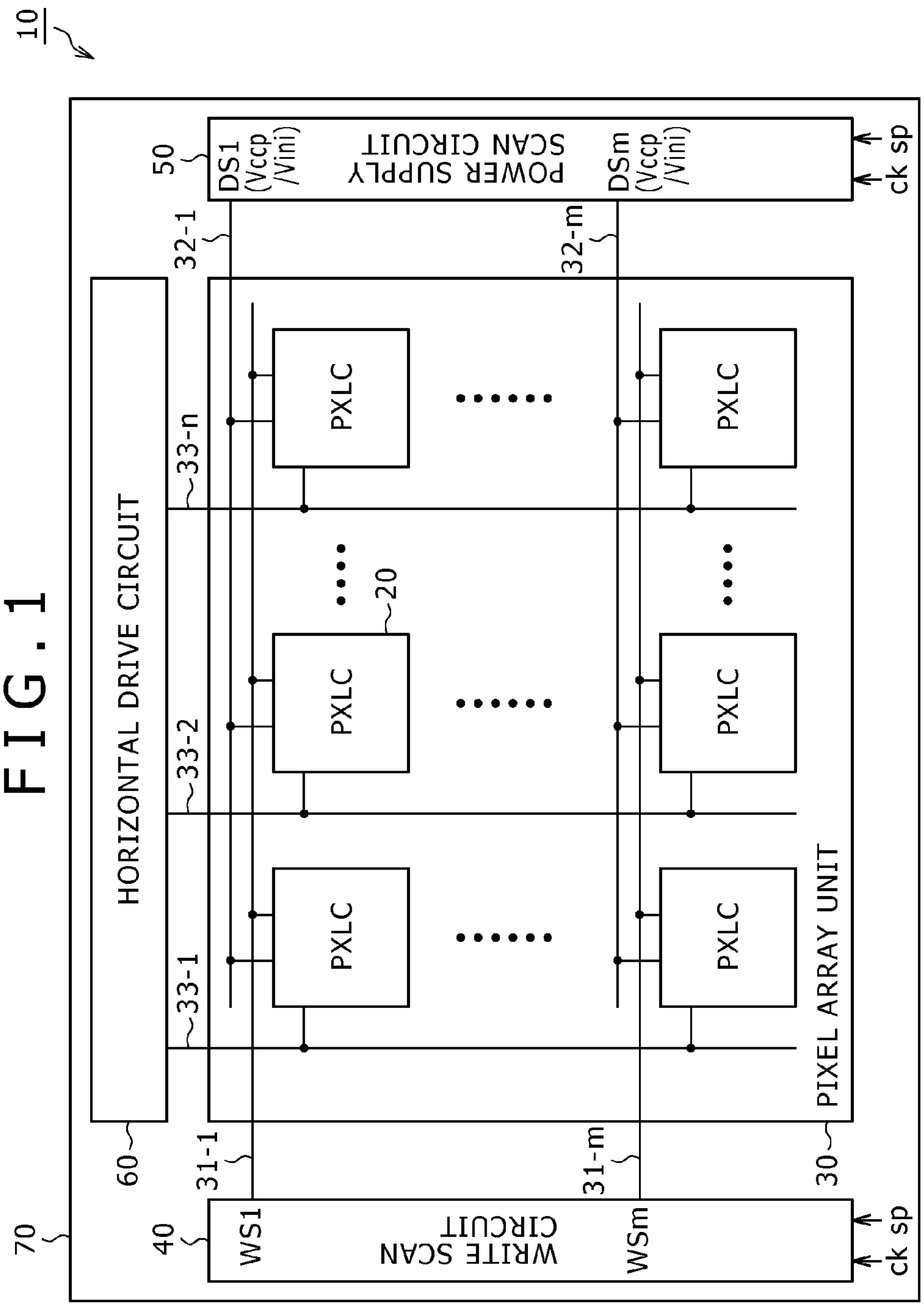
FIG. 1 is a system configuration diagram illustrating the schematic configuration of an active matrix organic EL display device which is a prerequisite for the embodiment of the present invention.

FIG. 1 is a system configuration diagram illustrating the schematic configuration of an active matrix display device which is a prerequisite for the embodiment of the present invention.

Here, a description will be given taking, as an example, an active matrix organic EL display device. The organic EL display device uses, as a light emitting element of each of the pixels (pixel circuits), an organic EL element (organic electroluminescent element) which is a current-driven electro-optical element whose light emission brightness changes according to the current flowing through the element.

As illustrated in FIG. 1, an organic EL display device 10 includes a pixel array section 30 and driving sections. The pixel array section 30 has pixels (PXLCs) 20 arranged two-dimensionally in a matrix form. The driving sections are disposed around the pixel array section 30 and adapted to drive the pixels 20. Among the driving sections adapted to drive the pixels 20 are a write scan circuit 40, power supply scan circuit 50 and horizontal drive circuit 60.

The pixel array section 30 has one of scan lines 31-1 to 31-*m* and one of power supply lines 32-1 to 32-*m* disposed for each pixel row and one of signal lines 33-1 to 33-*n* disposed for each pixel column for the pixels arranged in m rows by n columns.

The pixel array section 30 is typically formed on a transparent insulating substrate such as glass substrate to provide a flat panel structure. The pixels 20 of the pixel array section 30 may be formed with amorphous silicon TFTs (Thin Film Transistors) or low-temperature polysilicon TFTs. When low-temperature polysilicon TFTs are used, the write scan circuit 40, power supply scan circuit 50 and horizontal drive circuit 60 can also be implemented on a display panel (substrate) 70 on which the pixel array section 30 is formed.

The write scan circuit 40 includes shift registers or other components adapted to sequentially shift (transmit) a start pulse sp in synchronism with a clock pulse ck. During the writing of a video signal to the pixels 20 of the pixel array section 30, the same circuit 40 sequentially supplies write pulses WS1 to WSm (scan signals) respectively to the scan lines 31-1 to 31-*m* so as to scan the pixels 20 of the pixel array section 30 in succession on a row-by-row basis (progressive scan).

The power supply scan circuit 50 includes shift registers or other components adapted to sequentially shift (transmit) the start pulse sp in synchronism with the clock pulse ck. The same circuit 50 sequentially and selectively supplies power supply line potentials DS1 to DSm respectively to the power supply lines 32-1 to 32-*m* in synchronism with the progressive scan by the write scan circuit 40 so as to control the light emission and non-light emission of the pixels 20. The power supply line potentials DS1 to DSm are each switched between two different potentials, i.e., a first potential Vccp and a second potential Vini lower than the first potential Vccp.

The horizontal drive circuit 60 selects, as appropriate, either a video signal voltage Vsig (hereinafter may be simply written as “signal voltage”) appropriate to the brightness information or an offset voltage Vofs supplied from a signal supply source (not shown) so as to, for example, write the selected voltage to the pixels 20 of the pixel array section 30 via the signal lines 33-1 to 33-*n* on a row-by-row basis. That is, the horizontal drive circuit 60 employs progressive writing adapted to sequentially write the video signal voltage Vsig on a row-by-row (line-by-line) basis.

Here, the offset voltage Vofs is a reference voltage (e.g., voltage corresponding to the black level) which serves as a reference for the video signal voltage Vsig. On the other hand, the second potential Vini is set to a potential lower than the offset voltage Vofs. For example, letting the threshold voltage of the drive transistor 22 be denoted by Vth, the second potential Vini is set to a potential lower than Vofs−Vth, and preferably to a potential sufficiently lower than Vofs−Vth.

(Pixel Circuit)

Figure 2:
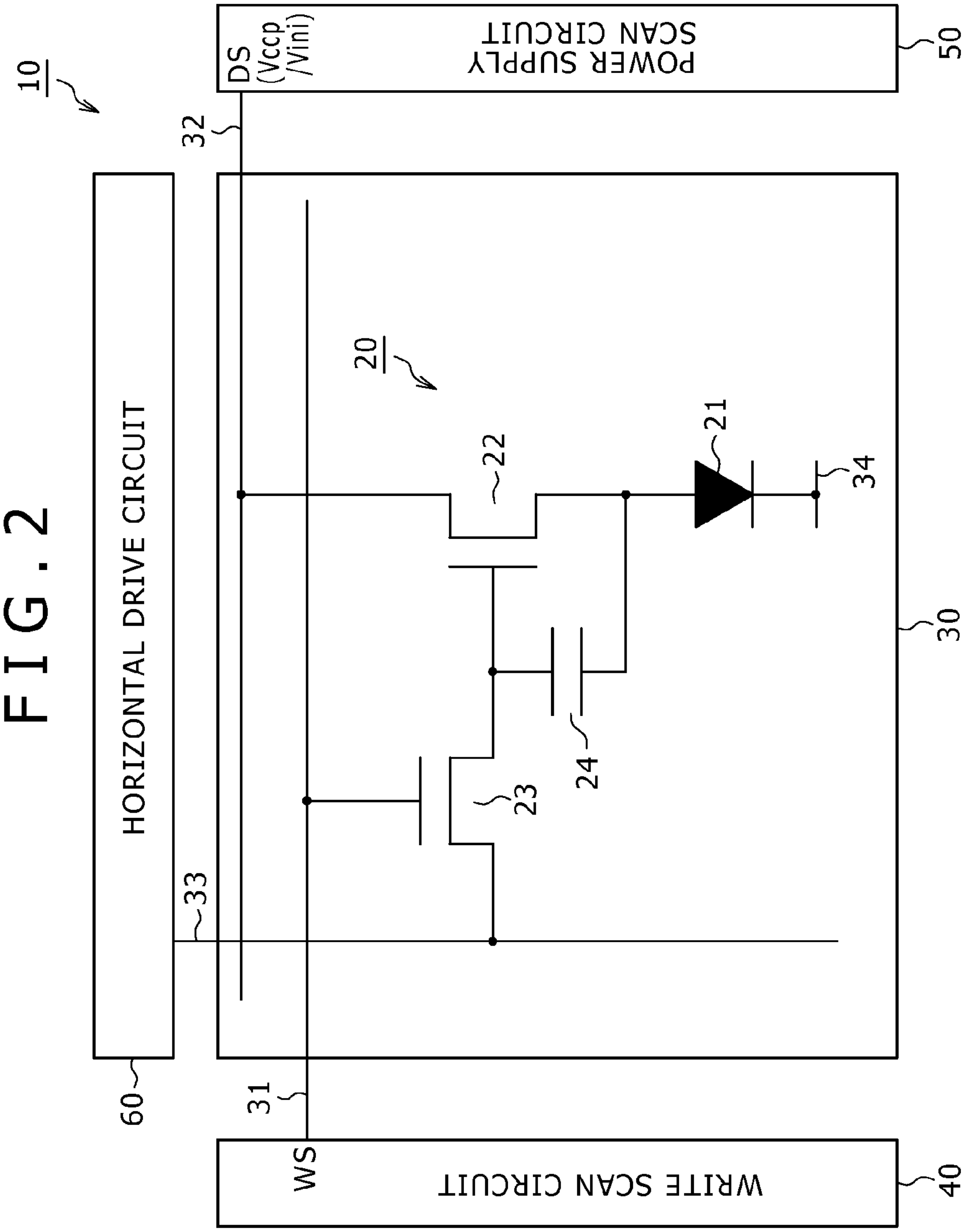
FIG. 2 is a circuit diagram illustrating a specific example of the configuration of a pixel (pixel circuit)

FIG. 2 is a circuit diagram illustrating a specific example of the configuration of the pixel (pixel circuit) 20.

As illustrated in FIG. 2, the pixel 20 includes, for example, as a light emitting element, an organic EL element 21 which is a type of current-driven electro-optical element whose light emission brightness changes according to the current flowing through the element. In addition to the same element 21, the pixel 20 includes a drive transistor 22, write transistor 23 and holding capacitance 24 as its components. That is, the pixel 20 is made up of two transistors (Tr) and one capacitor (C).

In the pixel 20 configured as described above, N-channel TFTs are used as the drive transistor 22 and write transistor

23. It should be noted, however, that the combination of conductivity types of the drive transistor 22 and write transistor 23 given here is merely an example, and the embodiment of the present invention is not limited to this combination.

The organic EL element 21 has its cathode electrode connected to a common power supply line 34 which is disposed commonly for all the pixels 20. The drive transistor 22 has its source electrode connected to the anode electrode of the organic EL element 21 and its drain electrode connected to the power supply line 32 (one of 32-1 to 32-*m*).

The write transistor 23 has its gate electrode connected to the scan line 31 (one of 31-1 to 31-*m*). The same transistor 23 has one of the source and drain electrodes connected to the signal line 33 (one of 33-1 to 33-*n*) and the other of the source and drain electrodes connected to the gate electrode of the drive transistor 22.

The holding capacitance 24 has one of its electrodes connected to the gate electrode of the drive transistor 22. The same capacitance 24 has its other electrode connected to the source electrode of the drive transistor 22 (anode electrode of the organic EL element 21).

In the pixel 20 made up of two transistors and one capacitor, the write transistor 23 conducts in response to the scan signal applied to its gate electrode by the write scan circuit 40 via the scan line 31. As the same transistor 23 conducts, it samples either the video signal voltage Vsig appropriate to the brightness information or offset voltage Vofs supplied from the horizontal drive circuit 60 via the signal line 33 and writes the sampled voltage to the pixel 20.

The written signal voltage Vsig or offset voltage Vofs is applied to the gate electrode of the drive transistor 22 and at the same time held by the holding capacitance 24. When the potential DS of the power supply line 32 (one of 32-1 to 32-*m*) is at the first potential Vccp, the drive transistor 22 is supplied with a current from the power supply line 32. As a result, the drive transistor 22 supplies the organic EL element with a drive current whose level is appropriate to the voltage level of the signal voltage Vsig held by the holding capacitance 24, thus current-driving the same element 21 to emit light.

(Circuit Operation of the Organic EL Display Device)

A description will be given next of the circuit operation of the organic EL display device 10 configured as described above based on the timing waveform diagram shown in FIG. 3 and using the operation explanatory diagrams shown in FIGS. 4 to 6. It should be noted that the write transistor 23 is represented by a switch symbol for simplification in the operation explanatory diagrams shown in FIGS. 4 to 6. It should also be noted that because the organic EL element 21 has a capacitive component, an EL capacitance 25 thereof is also shown.

Figure 3:
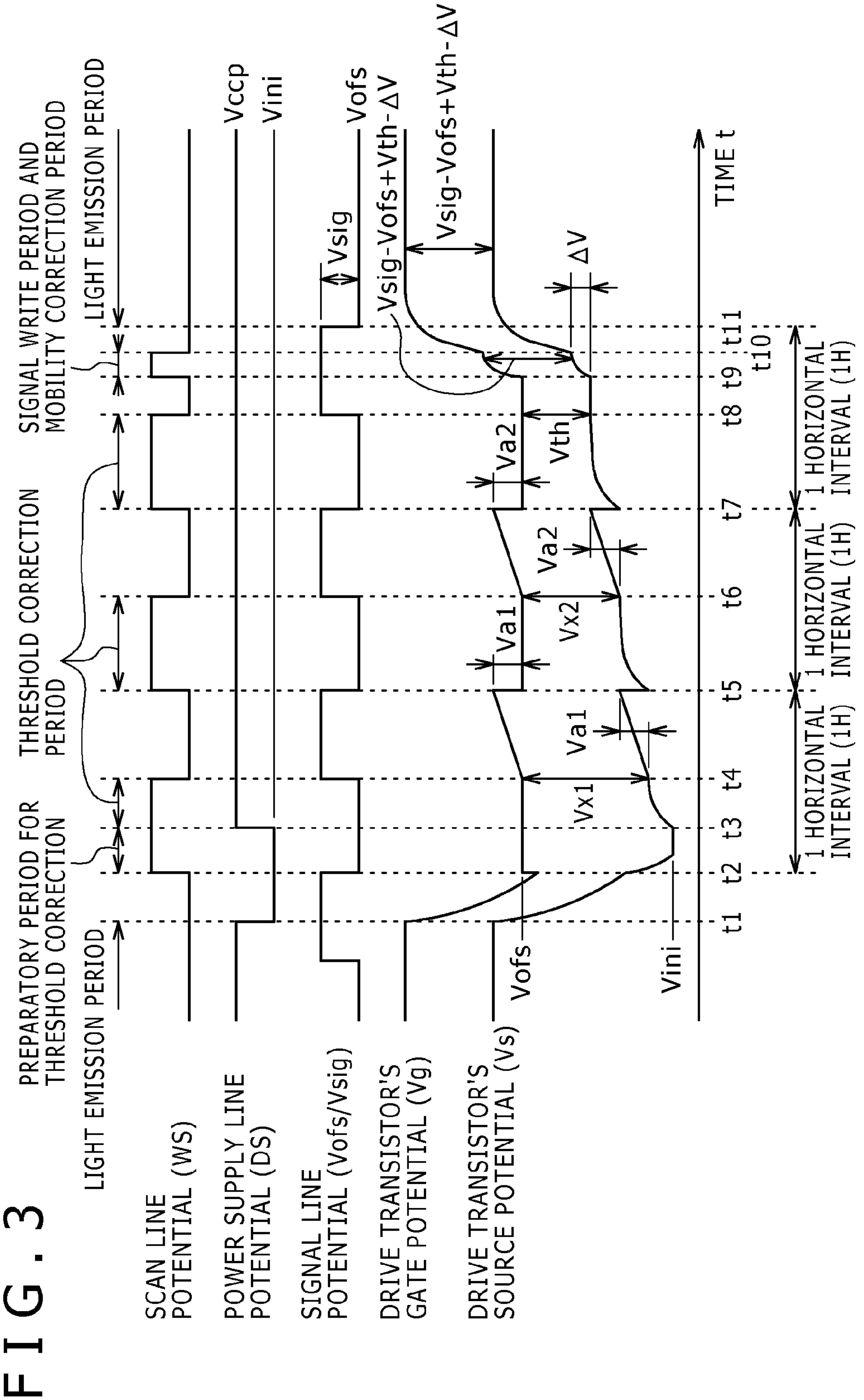
FIG. 3 is a timing waveform diagram used for the description of the operation of the active matrix organic EL display device which is a prerequisite for the embodiment of the present invention.

The timing waveform diagram in FIG. 3 illustrates the variations of the potential (write pulse) WS of the scan line 31 (one of 31-1 to 31-*m*), potential DS (Vccp/Vini) of the power supply line 32 (one of 32-1 to 32-*m*) and gate potential Vg and source potential Vs of the drive transistor 22.

<Light Emission Period>

In the timing diagram shown in FIG. 3, the organic EL element 21 emits light prior to time t1 (light emission period). In the light emission period, the potential DS of the power supply line 32 is at the first potential Vccp, and the write transistor 23 is not conducting.

Figure 4A:
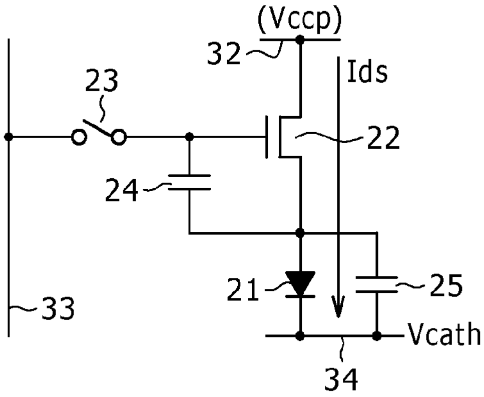
FIGS. 4A to 4D are explanatory diagrams (1) illustrating the circuit operation of the active matrix organic EL display device which is a prerequisite for the embodiment of the present invention.
Figure 4B:
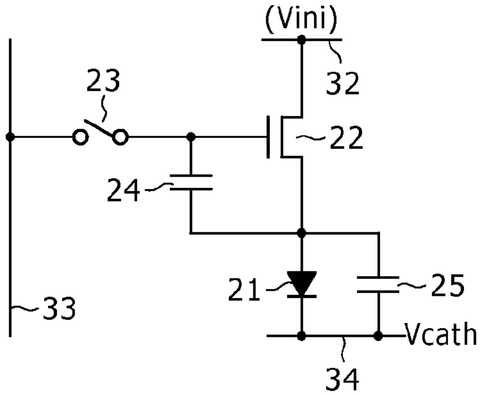

At this time, because the drive transistor 22 is designed to operate in the saturation region, a drive current (drain-to-source current) Ids appropriate to the gate-to-source voltage Vgs of the drive transistor 22 is supplied to the organic EL element 21 from the power supply line 32 via the drive transistor 22 as illustrated in FIG. 4A. As a result, the organic EL element 21 emits light at the brightness appropriate to the level of the drive current Ids.

<Preparatory Period for Threshold Correction>

Then, at time t1, the progressive scan of a new field begins. The potential DS of the power supply line 32 changes from the first potential (hereinafter written as "high potential") Vccp to the second potential (hereinafter written as "low potential") Vini which is sufficiently lower than Vofs−Vth (Vofs: offset voltage of the signal line 33).

Here, letting the threshold voltage of the organic EL element 21 be denoted by Vel and the potential of the common power supply line 34 by Vcath and assuming that Vini<Vel+Vcath for the low potential Vini, the source potential Vs of the drive transistor 22 is almost equal to the low potential Vini. As a result, the organic EL element 21 is reverse-biased, causing it to stop emitting light.

Figure 4C:
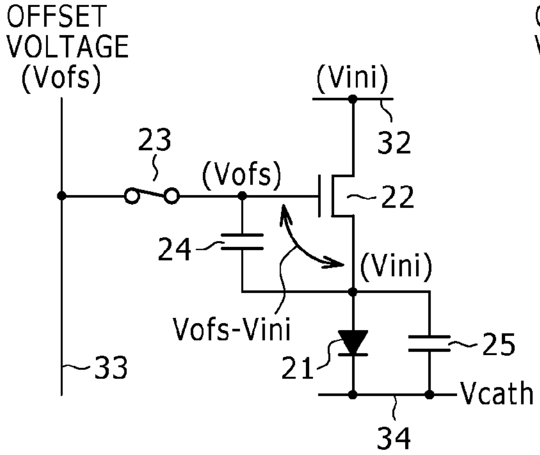

Next, at time t2, the potential WS of the scan line 31 changes from the low to high potential, bringing the write transistor 23 into conduction as illustrated in FIG. 4C. At this time, the horizontal drive circuit 60 supplies the offset voltage Vofs to the signal line 33. Therefore, the gate potential Vg of the drive transistor 22 becomes equal to the offset voltage Vofs. Further, the source potential Vs of the drive transistor 22 is at the low potential Vini which is sufficiently lower than the offset voltage Vofs.

At this time, the gate-to-source voltage Vgs of the drive transistor 22 is Vofs−Vini. Here, the threshold correction operation may not be performed unless Vofs−Vini is larger than the threshold voltage Vth of the drive transistor 22. Therefore, the potential relationship Vofs−Vini>Vth have to be established. Thus, the preparatory operation for threshold correction includes of fixing the gate potential Vg and source potential Vs of the drive transistor 22 respectively to the offset voltage Vofs and low potential Vini for initialization.

<First Threshold Correction Period>

Figure 4D:
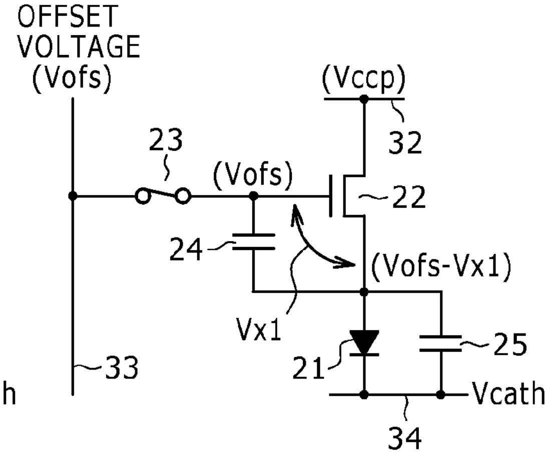

Next, at time t3, as the potential DS of the power supply line 32 changes from the low potential Vini to the high potential Vccp as illustrated in FIG. 4D, the source potential Vs of the drive transistor 22 begins to rise, initiating the first threshold correction period. In the first threshold correction period, as the source potential Vs of the drive transistor 22 rises, the gate-to-source voltage Vgs of the drive transistor 22 reaches a given potential Vx1. The potential Vx1 is held by the holding capacitance 24.

Figure 5A:
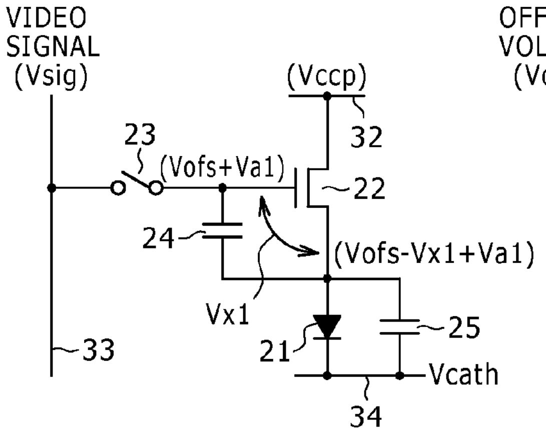
FIGS. 5A to 5D are explanatory diagrams (2) illustrating the circuit operation of the active matrix organic EL display device which is a prerequisite for the embodiment of the present invention.

Next, at time t4 in the second half of the horizontal interval (1H), the horizontal drive circuit 60 supplies the video signal voltage Vsig to the signal line 33 as illustrated in FIG. 5A, changing the potential of the signal line 33 from the offset voltage Vofs to the signal voltage Vsig. In this period, the signal voltage Vsig is written to the pixels in other row.

At this time, in order to prevent the signal voltage Vsig from being written to the pixels in the own row, the potential WS of the scan line 31 changes from the high to low potential, bringing the write transistor 23 out of conduction. This disconnects the gate electrode of the drive transistor 22 from the signal line 33, leaving the gate electrode floating.

Here, if the gate electrode of the drive transistor 22 is floating and if the source potential Vs of the drive transistor 22 varies due to the connection of the holding capacitance 24 between the gate and source electrodes of the drive transistor 22, the gate potential Vg of the same transistor 22 also varies with variation (varies to follow the variation) in the source potential Vs. This is the bootstrapping action by the holding capacitance 24.

At time t4 and beyond, the source potential Vs of the drive transistor 22 continues to rise by Va1 (Vs=Vofs−Vx1+Va1).

At this time, the gate potential Vg of the drive transistor 22 also rises by Va1 (Vg=Vofs+Va1) with the rise of the source potential Vs of the same transistor 22 because of the bootstrapping action.

<Second Threshold Correction Period>

Figure 5B:
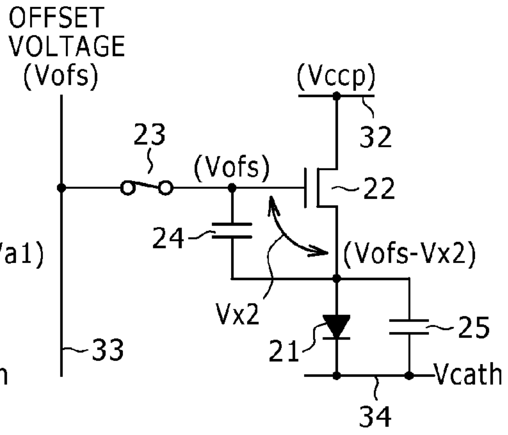

At time t5, a next horizontal interval begins. As illustrated in FIG. 5B, the potential WS of the scan line 31 changes from the low to high potential, bringing the write transistor 23 into conduction. At the same time, the horizontal drive circuit 60 supplies the offset voltage Vofs, rather than the signal voltage Vsig, to the signal line 33, initiating the second threshold correction period.

In the second threshold correction period, as the write transistor 23 conducts, the offset voltage Vofs is written. Therefore, the gate potential Vg of the drive transistor 22 is initialized again to the offset voltage Vofs. The source potential Vs declines with the decline of the gate potential Vg at this time. Then, the source potential Vs of the drive transistor 22 begins to rise again.

Then, as the source potential Vs of the drive transistor 22 rises in the second threshold correction period, the gate-to-source voltage Vgs of the same transistor 22 reaches a given potential Vx2. The potential Vx2 is held by the holding capacitance 24.

Figure 5C:
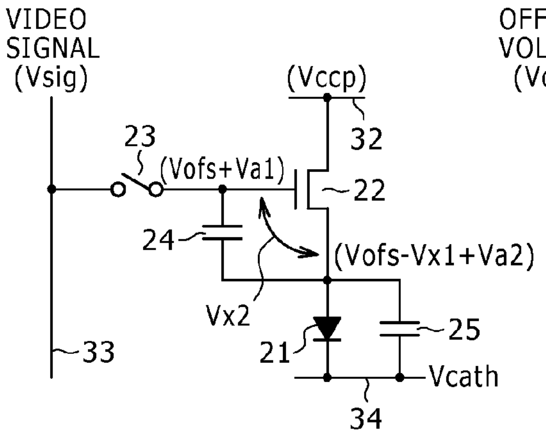

Next, at time t6 in the second half of the horizontal interval, the horizontal drive circuit 60 supplies the signal voltage Vsig to the signal line 33 as illustrated in FIG. 5C, changing the potential of the signal line 33 from the offset voltage Vofs to the signal voltage Vsig. In this period, the signal voltage Vsig is written to the pixels in other row (row next to the row in which the pixels were written the last time).

At this time, in order to prevent the signal voltage Vsig from being written to the pixels in the own row, the potential WS of the scan line 31 changes from the high to low potential, bringing the write transistor 23 out of conduction. This disconnects the gate electrode of the drive transistor 22 from the signal line 33, leaving the gate electrode floating.

At time t6 and beyond, the source potential Vs of the drive transistor 22 continues to rise by Va2 (Vs=Vofs−Vx1+Va2). At this time, the gate potential Vg of the drive transistor 22 also rises by Va2 (Vg=Vofs+Va2) with the rise of the source potential Vs of the same transistor 22 because of the bootstrapping action.

<Third Threshold Correction Period>

Figure 5D:
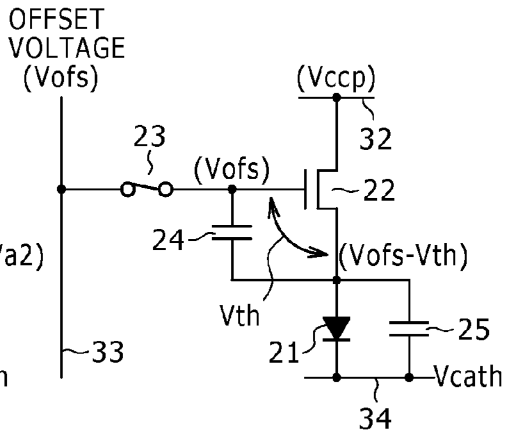

At time t7, a next horizontal interval begins. As illustrated in FIG. 5D, the potential WS of the scan line 31 changes from the low to high potential, bringing the write transistor 23 into conduction. At the same time, the horizontal drive circuit 60 supplies the offset voltage Vofs, rather than the signal voltage Vsig, to the signal line 33, initiating the third threshold correction period.

In the third threshold correction period, as the write transistor 23 conducts, the offset voltage Vofs is written. Therefore, the gate potential Vg of the drive transistor 22 is initialized again to the offset voltage Vofs. The source potential Vs declines with the decline of the gate potential Vg at this time. Then, the source potential Vs of the drive transistor 22 begins to rise again.

As the source potential Vs of the drive transistor 22 rises, the gate-to-source voltage Vgs of the same transistor 22 will converge to the threshold voltage Vth of the same transistor 22 before long. As a result, the voltage corresponding to the threshold voltage Vth is held by the holding capacitance 24.

As a result of the third threshold correction operation described above, the threshold voltage Vth of the drive transistor 22 in each of the pixels is detected, and the voltage corresponding to the threshold voltage Vth held by the holding capacitance 24. It should be noted that, in the third threshold correction period, the potential Vcath of the common power supply line 34 is set so that the organic EL element 21 goes into cutoff. This is done to ensure that a current flows merely to the holding capacitance 24 and not to the organic EL element 21.

<Signal Write Period and Mobility Correction Period>

Figure 6A:
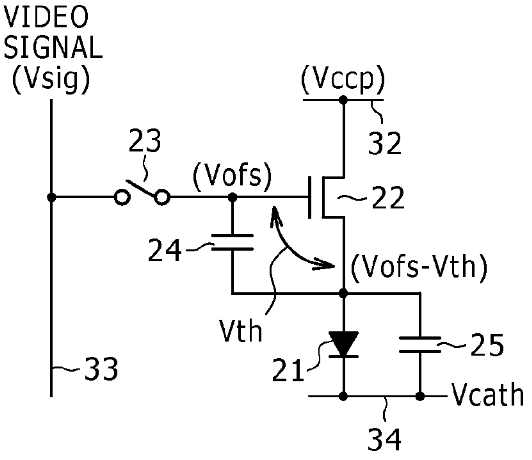
FIGS. 6A to 6C are explanatory diagrams (3) illustrating the circuit operation of the active matrix organic EL display device which is a prerequisite for the embodiment of the present invention.

Next, at time t8, the potential WS of the scan line 31 changes to the low potential, bringing the write transistor 23 out of conduction as illustrated in FIG. 6A. At the same time, the potential of the signal line 33 changes from the offset voltage Vofs to the video signal voltage Vsig.

As the write transistor 23 stops conducting, the gate electrode of the drive transistor 22 is left floating. However, the gate-to-source voltage Vgs of the drive transistor 22 is equal to the threshold voltage Vth of the same transistor 22. Therefore, the same transistor 22 is in cutoff. As a result, the drain-to-source current Ids does not flow through the drive transistor 22.

Figure 6B:
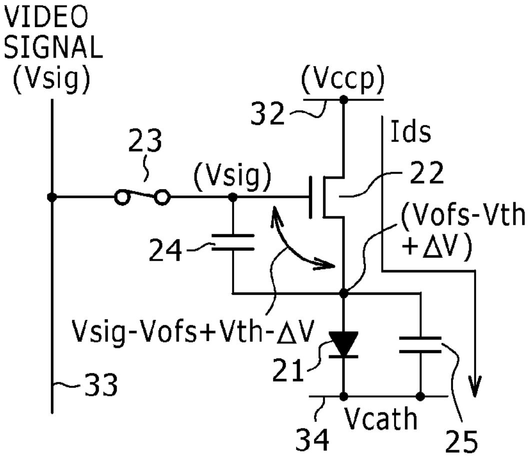

Next, at time t9, the potential WS of the scan line 31 changes to the high potential, bringing the write transistor 23 into conduction as illustrated in FIG. 6B. As a result, the same transistor 23 samples the video signal voltage Vsig and writes the voltage to the pixel 20. This writing of the signal voltage Vsig by the write transistor 23 brings the gate potential Vg of the drive transistor 22 equal to the signal voltage Vsig.

Then, when the drive transistor 22 drives the organic EL element 21 with the video signal voltage Vsig, the threshold voltage Vth of the drive transistor 22 is cancelled by the voltage held by the holding capacitance 24 which corresponds to the threshold voltage Vth, thus achieving the threshold correction. The principle of the threshold correction will be described later.

At this time, the organic EL element 21 is in cutoff (high impedance state) at first. Therefore, the current flowing from the power supply line 32 to the drive transistor 22 according to the video signal voltage Vsig (drain-to-source current Ids) flows into the EL capacitance 25 of the organic EL element 21, thus initiating the charging of the same capacitance 25.

Because of the charging of the EL capacitance 25, the source potential Vs of the drive transistor 22 rises over time. At this time, the variation of the threshold voltage Vth of the drive transistor 22 has already been corrected (by the threshold correction). As a result, the drain-to-source current Ids of the drive transistor 22 is dependent merely upon the mobility μ of the same transistor 22.

When the source potential Vs of the drive transistor 22 rises to the potential equal to Vofs−Vth+ΔV before long, the gate-to-source voltage Vgs of the same transistor 22 becomes equal to Vsig−Vofs+Vth−ΔV. That is, the increment ΔV of the source potential Vs acts so that it is subtracted from the voltage (Vsig−Vofs+Vth) held by the holding capacitance 24, in other words, so that the charge stored in the holding capacitance 24 is discharged. This means that a negative feedback is applied. Therefore, the increment ΔV of the source potential Vs of the drive transistor 22 is a feedback amount of the negative feedback.

As described above, if the drain-to-source current Ids flowing through the drive transistor 22 is negatively fed back to the gate input, i.e., the gate-to-source voltage Vgs, of the same transistor 22, the dependence of the drain-to-source current Ids of the same transistor 22 upon the mobility μ can be cancelled. That is, the variation of the mobility μ between the pixels can be corrected.

More specifically, the higher the video signal voltage Vsig, the larger the drain-to-source current Ids, and therefore the larger the absolute value of the negative feedback amount (correction amount) ΔV. As a result, the mobility is corrected according to the light emission brightness. If the video signal voltage Vsig is maintained constant, the larger the mobility μ of the drive transistor 22, the larger the absolute value of the negative feedback amount ΔV. This makes it possible to eliminate the variation of the mobility μ between the pixels. The principle of the mobility correction will be described later.

<Light Emission Period>

Figure 6C:
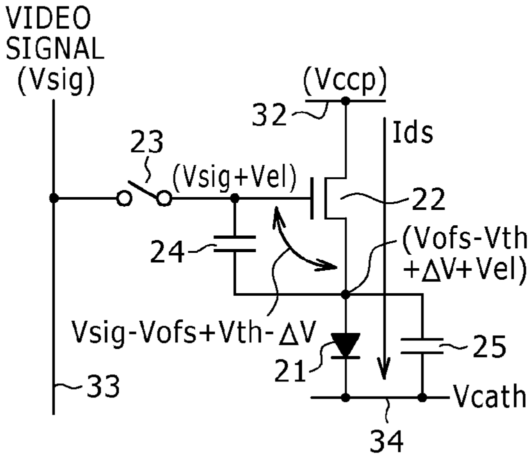

Next, at time t10, the potential WS of the scan line 31 changes to the low potential, bringing the write transistor 23 out of conduction as illustrated in FIG. 6C. This disconnects the gate electrode of the drive transistor 22 from the signal line 33, leaving the gate electrode floating.

When the gate electrode of the drive transistor 22 is left floating and at the same time the drain-to-source current Ids of the same transistor 22 begins to flow into the organic EL element 21, the anode potential of the same element 21 rises according to the drain-to-source current Ids of the same transistor 22.

The rise of the anode potential of the organic EL element 21 is nothing other than the rise of the source potential Vs of the drive transistor 22. As the source potential Vs of the drive transistor 22 rises, the gate potential Vg of the same transistor 22 will also rise because of the bootstrapping action.

At this time, assuming that the bootstrap gain is unity (ideal value), the increment of the gate potential Vg is equal to the increment of the source potential Vs. In the light emission period, therefore, the gate-to-source voltage Vgs of the drive transistor 22 is maintained constant at Vsig−Vofs+Vth−ΔV. Then, at time t11, the potential of the signal line 33 changes from the video signal voltage Vsig to the offset voltage Vofs.

As is clear from the above description of the operation, the threshold correction period spans three horizontal intervals, i.e., one horizontal interval during which the signal writing and mobility correction are performed and two horizontal intervals preceding the one horizontal interval. This provides a sufficient time for the threshold correction period, thus allowing to reliably detect the threshold voltage Vth of the drive transistor 22 and hold the voltage in the holding capacitance 24 for the reliable threshold correction operation.

Although the threshold correction period spans three horizontal intervals, this is merely an example. If the one horizontal interval during which the signal writing and mobility correction are performed is sufficient for the threshold correction period, there is no need to provide a threshold correction period spanning the preceding horizontal intervals. On the other hand, if one horizontal interval becomes shorter as a result of providing a higher definition and if three horizontal intervals are not sufficient for the threshold correction period, this period may span four horizontal intervals or longer.

(Principle of the Threshold Correction)

Here, a description will be given of the principle of the threshold correction of the drive transistor 22. The drive transistor 22 is designed to operate in the saturation region. Therefore, the same transistor 22 functions as a constant current source. As a result, the constant drain-to-source current (drive current) Ids, given by the following formula (1), is supplied to the organic EL element 21 from the drive transistor 22:

$$Ids=(1/2)\cdot\mu(W/L)Cox(Vgs-Vth)^2 \quad (1)$$

where W is the channel width, L the channel length, and Cox the gate capacitance per unit area.

Figure 7:
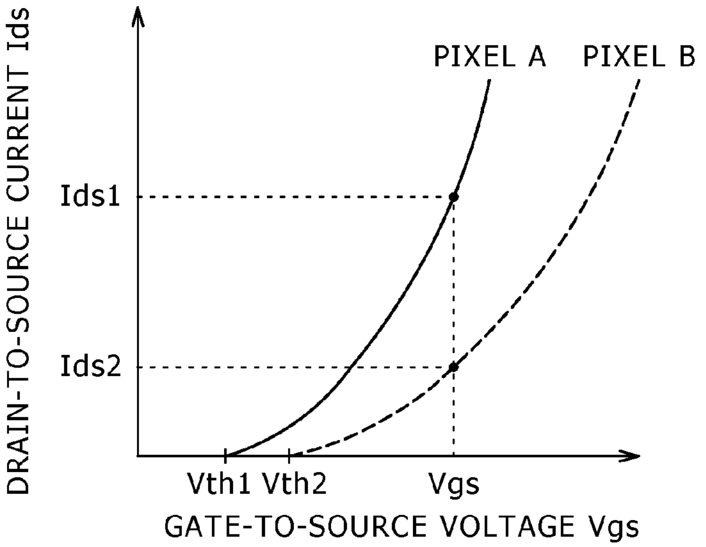
FIG. 7 is a characteristic diagram used for the description of the problem caused by the variation of a threshold voltage Vth of a drive transistor.

FIG. 7 illustrates the characteristic of the drain-to-source current Ids of the drive transistor 22 vs. gate-to-source voltage Vgs of the same transistor 22.

As illustrated in this characteristic diagram, unless the variation of the threshold voltage Vth of the drive transistor 22 between the pixels is corrected, the drain-to-source current Ids appropriate to the gate-to-source voltage Vgs is Ids1 when the threshold voltage Vth is Vth1.

In contrast, when the threshold voltage Vth is Vth2 (Vth2>Vth1), the drain-to-source current Ids appropriate to the same gate-to-source voltage Vgs is Ids2 (Ids2<Ids). That is, the drain-to-source current Ids changes with change in the threshold voltage Vth of the drive transistor 22 even if the gate-to-source voltage Vgs remains unchanged.

In the pixel (pixel circuit) 20 configured as described above, on the other hand, the gate-to-source voltage Vgs of the drive transistor 22 during light emission is Vsig−Vofs+Vth−ΔV as mentioned earlier. Substituting this into the formula (1), the drain-to-source current Ids is expressed as follows:

$$Ids=(1/2)\cdot\mu(W/L)Cox(Vsig-Vofs-\Delta V)^2 \quad (2)$$

That is, the term of the threshold voltage Vth of the drive transistor 22 is cancelled. The drain-to-source current Ids supplied from the drive transistor 22 to the organic EL element 21 is independent of the threshold voltage Vth of the drive transistor 22. As a result, the drain-to-source current Ids remains unchanged irrespective of the variation of the threshold voltage Vth of the drive transistor 22 from one pixel to another due to the manufacturing process variation or change over time. This makes it possible to maintain the light emission brightness of the organic EL element 21 constant.

(Principle of the Mobility Correction)

Figure 8:
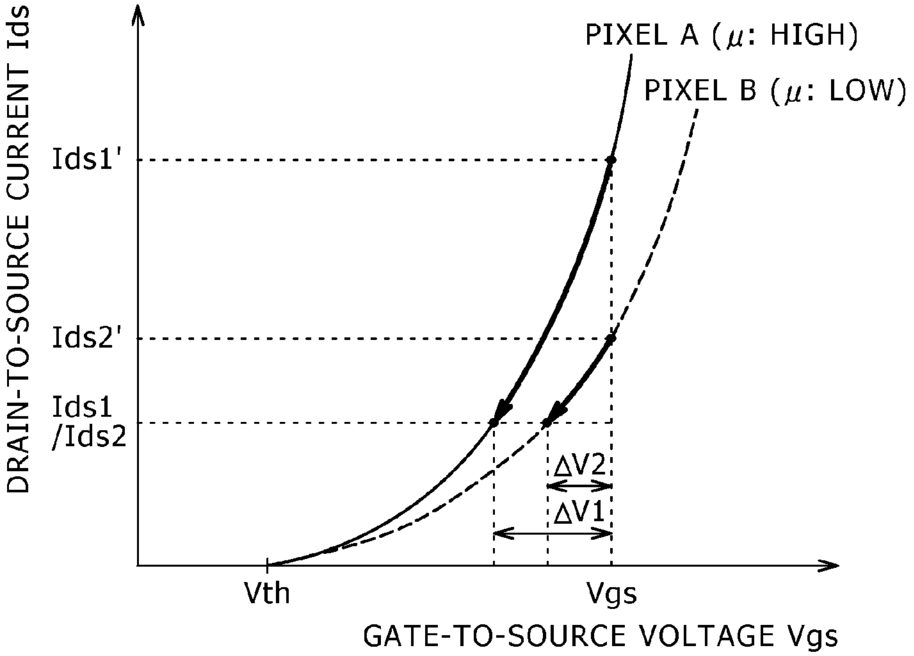
FIG. 8 is a characteristic diagram used for the description of the problem caused by the variation of a mobility μ of a drive transistor.

A description will be given next of the principle of the mobility correction of the drive transistor 22. FIG. 8 illustrates a characteristic curve comparing a pixel A with the relatively large mobility μ of the drive transistor 22 and a pixel B with the relatively small mobility μ of the drive transistor 22. If the drive transistor 22 includes, for example, a polysilicon thin film transistor, it is inevitable that the mobility μ varies from one pixel to another as with the pixels A and B.

If the video signal voltage Vsig at the same level is, for example, applied to the pixels A and B when there is a variation in the mobility μ between the two pixels, there will be a large difference between a drain-to-source current Ids1' flowing through the pixel A with the large mobility μ and a drain-to-source current Ids2' flowing through the pixel B with the small mobility μ, unless the mobility μ is corrected in one way or another. Thus, the screen uniformity is impaired in the event of a large difference in the drain-to-source current Ids as a result of the variation of the mobility μ between the pixels.

As is clear from the transistor characteristic formula (1) given above, the larger the mobility μ, the larger the drain-to-source current Ids. Therefore, the larger the mobility μ, the larger the negative feedback amount ΔV. As illustrated in FIG. 8, a feedback amount ΔV1 of the pixel A with the large mobility μ is larger than a feedback amount ΔV2 of the pixel B with the small mobility μ.

For this reason, if the drain-to-source current Ids of the drive transistor 22 is negatively fed back to the video signal voltage Vsig by the mobility correction operation, the larger the mobility μ, the greater the extent to which a negative feedback is applied. This suppresses the variation of the mobility μ from one pixel to another.

More specifically, if the pixel A with the large mobility μ is corrected with the feedback amount ΔV1, the drain-to-source current Ids declines significantly from Ids1' to Ids1. On the other hand, the feedback amount ΔV2 of the pixel B with the small mobility μ is small. Therefore, the drain-to-source current Ids declines merely from Ids2' to Ids2, which is not a significant drop. As a result, the drain-to-source current Ids1 of the pixel A becomes almost equal to the drain-to-source current Ids2 of the pixel B, thus correcting the variation of the mobility μ from one pixel to another.

Summing up the above, if the pixels A and B have the different mobilities μ, the feedback amount ΔV1 of the pixel A with the large mobility μ is larger than the feedback amount ΔV2 of the pixel B with the small mobility μ. That is, the larger the mobility μ, the larger the feedback amount ΔV, and the more the drain-to-source current Ids declines.

Therefore, the level of the drain-to-source current Ids of the drive transistor 22 can be made uniform between the pixels with the different mobilities μ by negatively feeding back the drain-to-source current Ids of the drive transistor 22 to the video signal voltage Vsig. This makes it possible to correct the variation of the mobility μ from one pixel to another.

Here, a description will be given of the relationship between the video signal potential (sampling potential) Vsig and drain-to-source current Ids of the drive transistor 22 in the pixel (pixel circuit) 20 shown in FIG. 2 with reference to FIGS. 9A to 9C. The above relationship will be described in different cases with and without the threshold and mobility corrections.

Figure 9A:
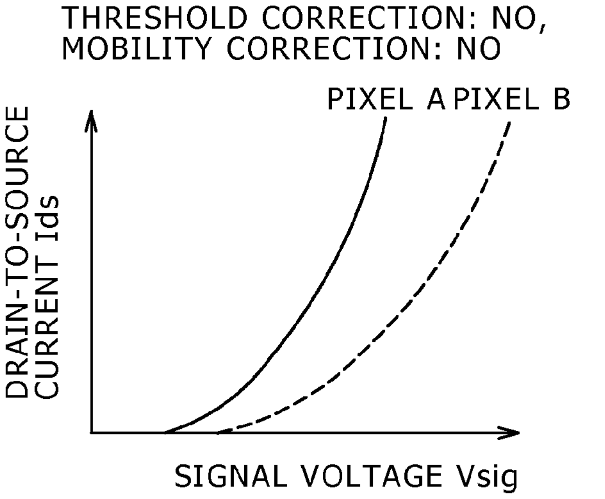
FIGS. 9A to 9C are characteristic diagrams used for the description of the relationship between a video signal voltage Vsig and a drain-to-source current Ids of the drive transistor with and without the threshold and mobility corrections.
Figure 9B:
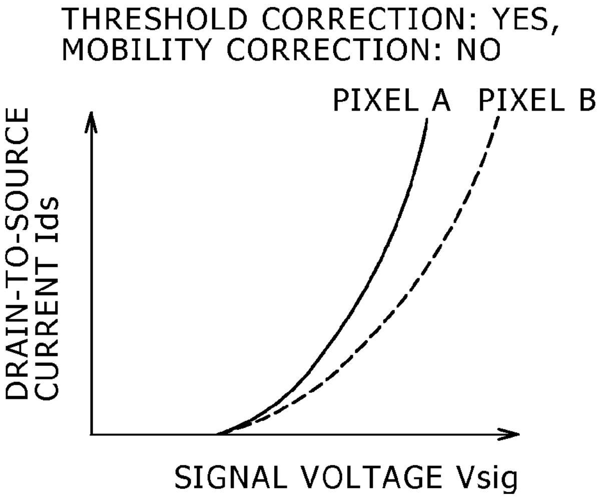
Figure 9C:
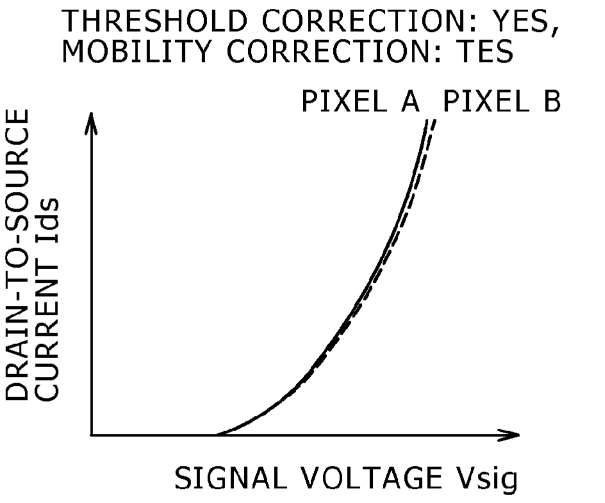

In FIGS. 9A to 9C, FIG. 9A illustrates the case in which neither the threshold correction nor the mobility correction is performed. FIG. 9B illustrates the case in which the threshold correction is performed, but not the mobility correction. FIG. 9C illustrates the case in which both the threshold and mobility corrections are performed. As illustrated in FIG. 9A, if neither the threshold correction nor the mobility correction is performed, there is a large difference in the drain-to-source current Ids between the pixels A and B as a result of the variation of the threshold voltage Vth and mobility μ between the two pixels.

In contrast, if merely the threshold correction is performed, the variation of the drain-to-source current Ids can be reduced to some extent by the threshold correction as illustrated in FIG. 9B. However, the difference remains in the drain-to-source current Ids between the pixels A and B caused by the variation of the mobility μ between the two pixels.

If both the threshold and mobility corrections are performed, the difference in the drain-to-source current Ids between the pixels A and B caused by the variation of the threshold voltage Vth and mobility μ between the two pixels can be almost completely eliminated as illustrated in FIG. 9C. This ensures constant brightness of the organic EL element 21 free from variation, thus providing a high-quality on-screen image.

Further, the following advantageous effects can be achieved by providing the pixel 20 shown in FIG. 2 with the bootstrapping function mentioned earlier in addition to the threshold and mobility correction functions.

That is, even if the source potential Vs of the drive transistor 22 changes with change in the I-V characteristic of the organic EL element 21 over time, the gate-to-source voltage Vgs of the same transistor 22 is maintained constant thanks to the bootstrapping action of the holding capacitance 24. As a result, the current flowing through the organic EL element 21 remains unchanged. Therefore, the light emission brightness of the organic EL element 21 is maintained constant. This provides an on-screen image free from brightness deterioration even in the event of a change of the I-V characteristic of the organic EL element 21 over time.

[Problems Attributable to Reduced Capacitance Value of the Capacitive Component of the Organic EL Element]

As described above, in the organic EL display device 10 having the threshold and mobility correction functions, as the pixel size becomes finer as a result of providing a higher definition, the electrodes forming the organic EL element 21 grow smaller in size. As a result, the capacitance value of the capacitive component of the same element 21 becomes smaller. This leads to a decline in the write gain of the video signal voltage Vsig by as much as the decline in the capacitance value of the capacitive component of the organic EL element 21.

Here, letting the capacitance value of the EL capacitance 25 be denoted by Cel and the capacitance value of the holding capacitance 24 by Cs, the voltage Vgs held by the holding capacitance 24 when the video signal voltage Vsig is written is expressed as follows:

$$Vgs = Vsig \times \{1 - Cs/(Cs+Cel)\} \tag{3}$$

Therefore, the ratio between the voltage Vgs held by the holding capacitance 24 and the signal voltage Vsig, i.e., a write gain G (=Vgs/Vsig), can be expressed as follows:

$$G = 1 - Cs/(Cs+Cel) \tag{4}$$

As is clear from this formula (4), if the capacitance value Cel of the capacitive component of the organic EL element 21 declines, the write gain G will decline by as much as the decline therein.

In order to compensate for the decline in the write gain G, an auxiliary capacitance need merely be attached to the source electrode of the drive transistor 22. Letting the capacitance value of the auxiliary capacitance be denoted by Csub, the write gain G can be expressed as follows:

$$G = 1 - Cs/(Cs+Cel+Csub) \tag{5}$$

As is clear from the formula (5), the larger the capacitance value Csub of the auxiliary capacitance to be attached, the closer the write gain G is to unity. The voltage Vgs close to the video signal voltage written to the pixel 20 can be held by the holding capacitance 24. This makes it possible to provide a light emission brightness appropriate to the video signal voltage written to the pixel 20.

As is clear from the above description, the write gain G of the video signal voltage Vsig can be adjusted by adjusting the capacitance value Csub of the auxiliary capacitance. On the other hand, the drive transistor 22 differs in size depending upon the light emission color of the organic EL element 21. Therefore, white balance can be achieved by adjusting the capacitance value Csub of the auxiliary capacitance according to the emission color of the organic EL element 21, i.e., the size of the drive transistor 22.

On the other hand, letting the drain-to-source current of the drive transistor 22 be denoted by Ids and the voltage increment corrected by the mobility correction by ΔV, a mobility correction period t during which the aforementioned mobility correction is to be performed is determined as follows:

$$T = (Cel+Csub) \times \Delta V/Ids \tag{6}$$

As is clear from the formula (6), the mobility correction period t can be adjusted by the capacitance value Csub of the auxiliary capacitance.

[Pixel Configuration Having an Auxiliary Capacitance]

Figure 10:
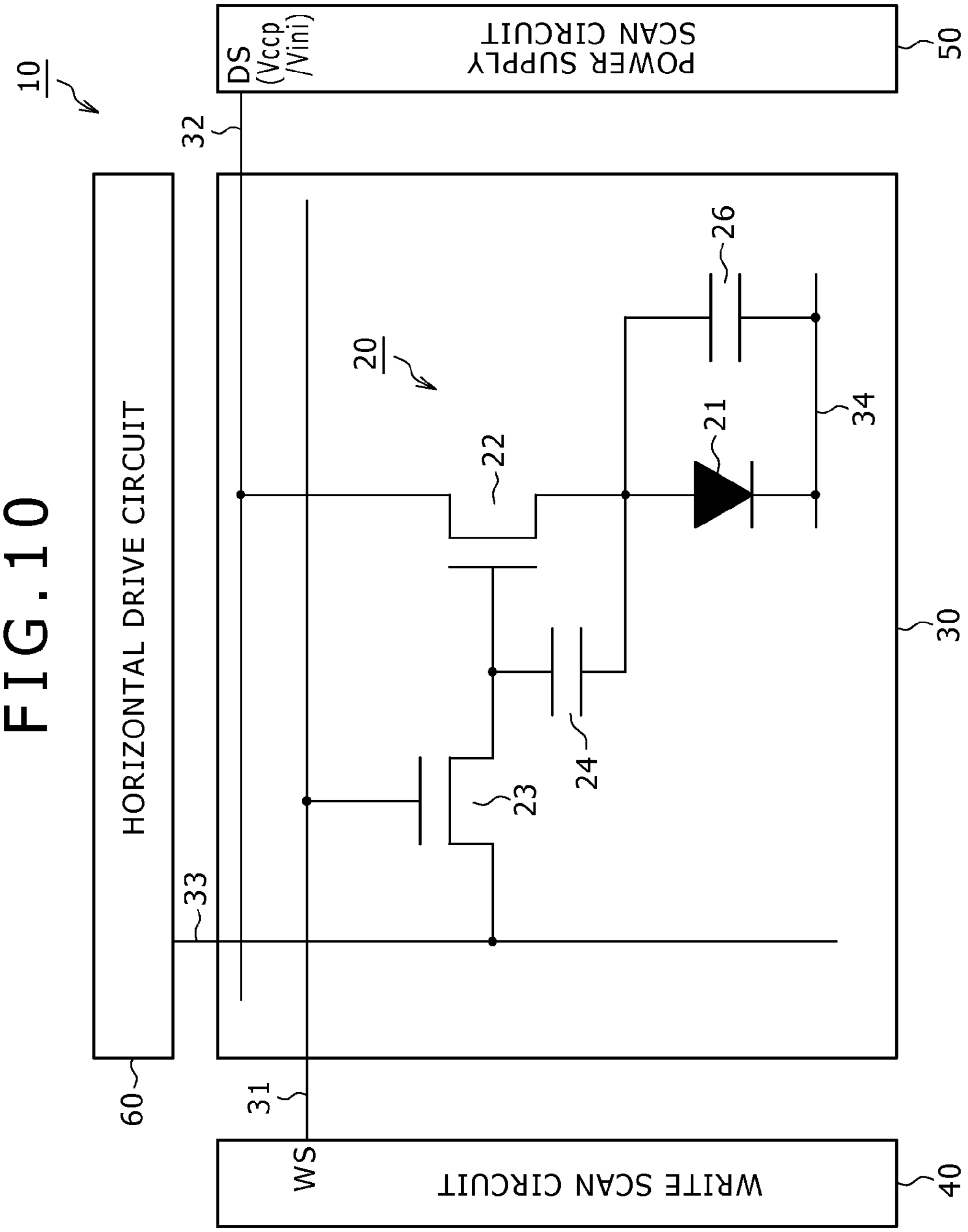
FIG. 10 is a circuit diagram illustrating the pixel configuration having an auxiliary capacitance.

FIG. 10 is a circuit diagram illustrating the pixel configuration having an auxiliary capacitance. In FIG. 10, like components are designated by the same reference numerals as in FIG. 2.

As illustrated in FIG. 10, the pixel 20 includes the organic EL element 21 as a light-emitting element. The pixel 20 includes, in addition to the organic EL element 21, the drive transistor 22, write transistor 23 and holding capacitance 24. The pixel configured as described above further includes an auxiliary capacitance 26. The same capacitance 26 has one of its electrodes connected to the source electrode of the drive transistor 22 and the other electrode connected to the common power supply line 34 serving as a fixed potential.

Here, if the cathode wiring is routed in the TFT layer (corresponding to a TFT layer 207 in FIGS. 16 to 18) in order to form the auxiliary capacitance 26, problems occurs such as horizontal crosstalk which is caused by the limited layout area of the pixel 20 or wiring resistance in the pixel 20. Horizontal crosstalk occurs due to the wiring resistance for the following reason.

Figure 11:
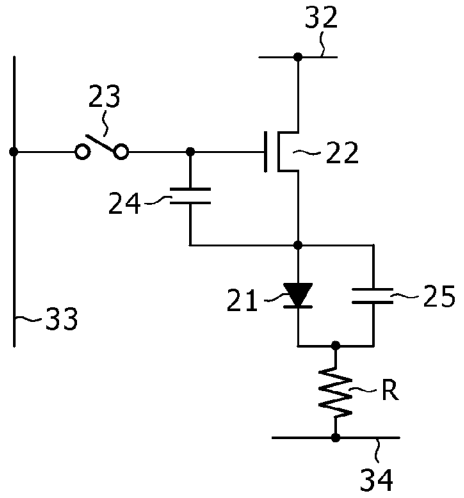
FIG. 11 is an equivalent circuit diagram illustrating a wiring resistance R resulting from a cathode wiring run in a TFT layer.
Figure 12:
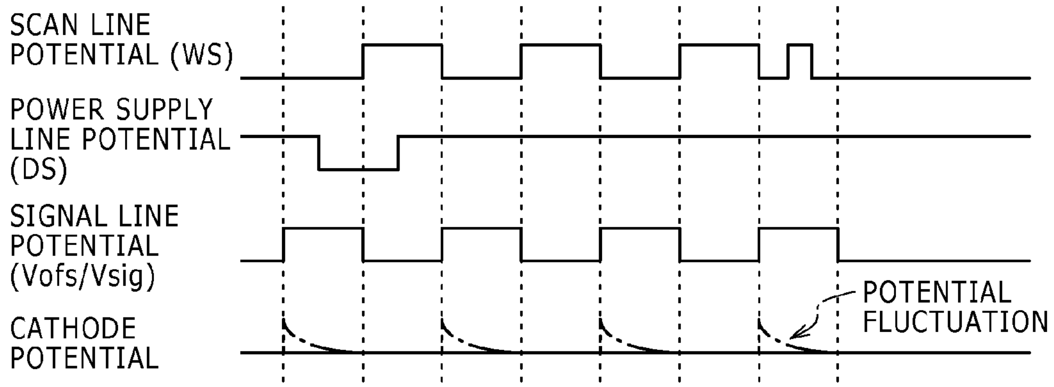
FIG. 12 is a timing waveform diagram illustrating the variation of a cathode potential caused by the wiring resistance R.
Figure 13:
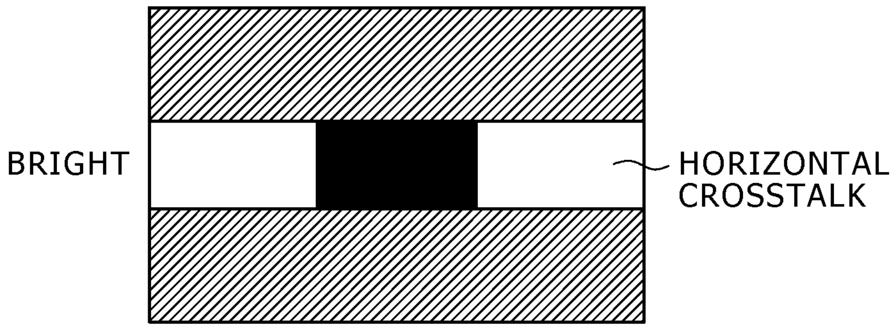
FIG. 13 is a view illustrating horizontal crosstalk caused by the wiring resistance R.

If the cathode wiring is routed in the TFT layer, a wiring resistance R mediates between the cathode electrode of the organic EL element 21 and common power supply line 34 as illustrated in FIG. 11. As a result, the cathode potential of the organic EL element 21 fluctuates synchronously with the variation of the potential of the signal line 33 as illustrated in FIG. 12. When a black window is displayed, for example, as illustrated in FIG. 13, this fluctuation of the cathode potential is visually identified as a crosstalk brighter than the regions above and below the black window on the display screen (horizontal crosstalk).

FEATURES OF THE PRESENT EMBODIMENT

Figure 14:
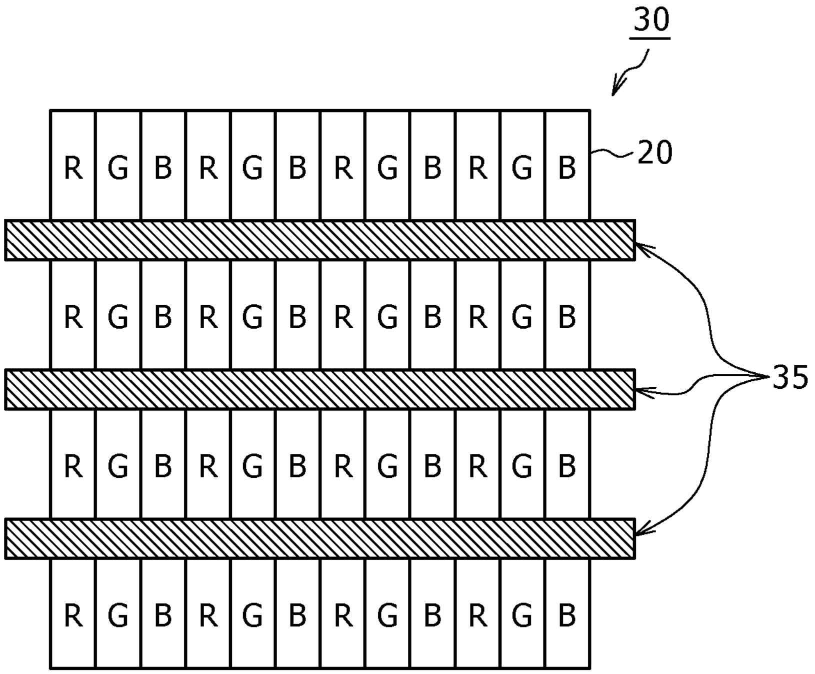
FIG. 14 is a plan view illustrating a layout example of auxiliary electrodes for the pixel arrangement in a matrix form.

The present embodiment is, therefore, defined in that the auxiliary capacitance 26 is formed by positively using auxiliary electrodes 35. The auxiliary electrodes 35 are each electrically connected to the common power supply line 34 serving as the cathode electrode of the organic EL element 21. In the same layer (anode layer) as the anode electrode of the organic EL element 21, the auxiliary electrodes 35 are at a fixed potential (cathode potential) and disposed, for example, in rows (one for each pixel row) for the pixels of the pixel array section 30 arranged in a matrix form as illustrated in FIG. 14. The other electrode of the auxiliary capacitance 26 is electrically connected to the auxiliary electrode 35 (contact is established therebetween) for each of the pixels 20.

In FIG. 14, the auxiliary electrodes 35 are disposed in rows for the pixels 20 of the pixel array section 30. However, this is merely an example. The auxiliary electrodes 35 may be disposed in columns (one for each pixel column) or in a grid form (one for each pixel row and for each pixel column) for the pixels 20 of the pixel array section 30. Also in these cases, contact can be established between the auxiliary electrode 35 and other electrode of the auxiliary capacitance 26 for each of the pixels 20 as when the auxiliary electrodes 35 are disposed in rows.

(Pixel Layout Structure)

Figure 15:
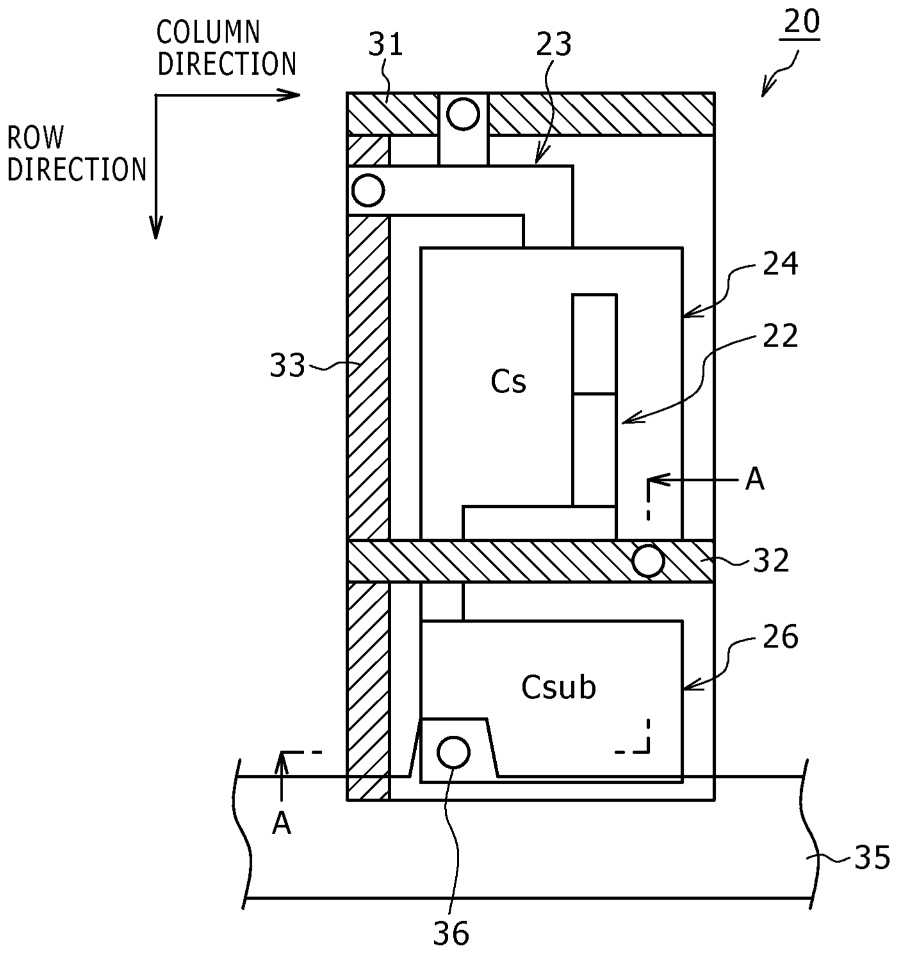
FIG. 15 is a plan view schematically illustrating a pixel layout structure having the auxiliary capacitance.

FIG. 15 is a plan view schematically illustrating a pixel layout structure of the pixel 20 having the auxiliary capacitance 26.

As illustrated in FIG. 15, the scan line 31 (one of 31-1 to 31-*m*) is disposed along the row (in the row direction of pixels) close to the upper pixel row. The power supply line 32 (one of 32-1 to 32-*m*) is disposed downward from the middle portion. The auxiliary electrode 35 is disposed along the row above the lower pixel row. Further, the signal line 33 (one of 33-1 to 33-*n*) is disposed along the column (in the column direction of pixels) close to the pixel column on the left.

The drive transistor 22, write transistor 23 and holding capacitance 24 are formed in the region between the scan line 31 and power supply line 32 of the pixel 20. The auxiliary capacitance 26 is formed in the region between the power supply line 32 and auxiliary electrode 35 of the pixel 20. Contact (electrical connection) is established between the other electrode of the auxiliary capacitance 26 and the auxiliary electrode 35 by a contact portion 36 for each of the pixels. The auxiliary electrode 35 is applied with a fixed potential (cathode potential) from the common power supply line 34.

As described above, the auxiliary electrodes 35 are applied with a fixed potential from the common power supply line 34 serving as the cathode electrode of the organic EL element 21. The same electrodes 35 are disposed in rows, in columns or in a grid form for the pixels arranged in a matrix form. For the organic EL display device configured as described above, specific examples will be described below as to how to establish contact between the other electrode of the auxiliary capacitance 26 and the auxiliary electrode 35 for each of the pixels 20 so as to apply a fixed potential to the other electrode of the auxiliary capacitance 26 and form the auxiliary capacitance 26 for the fixed potential.

Example 1

Figure 16:
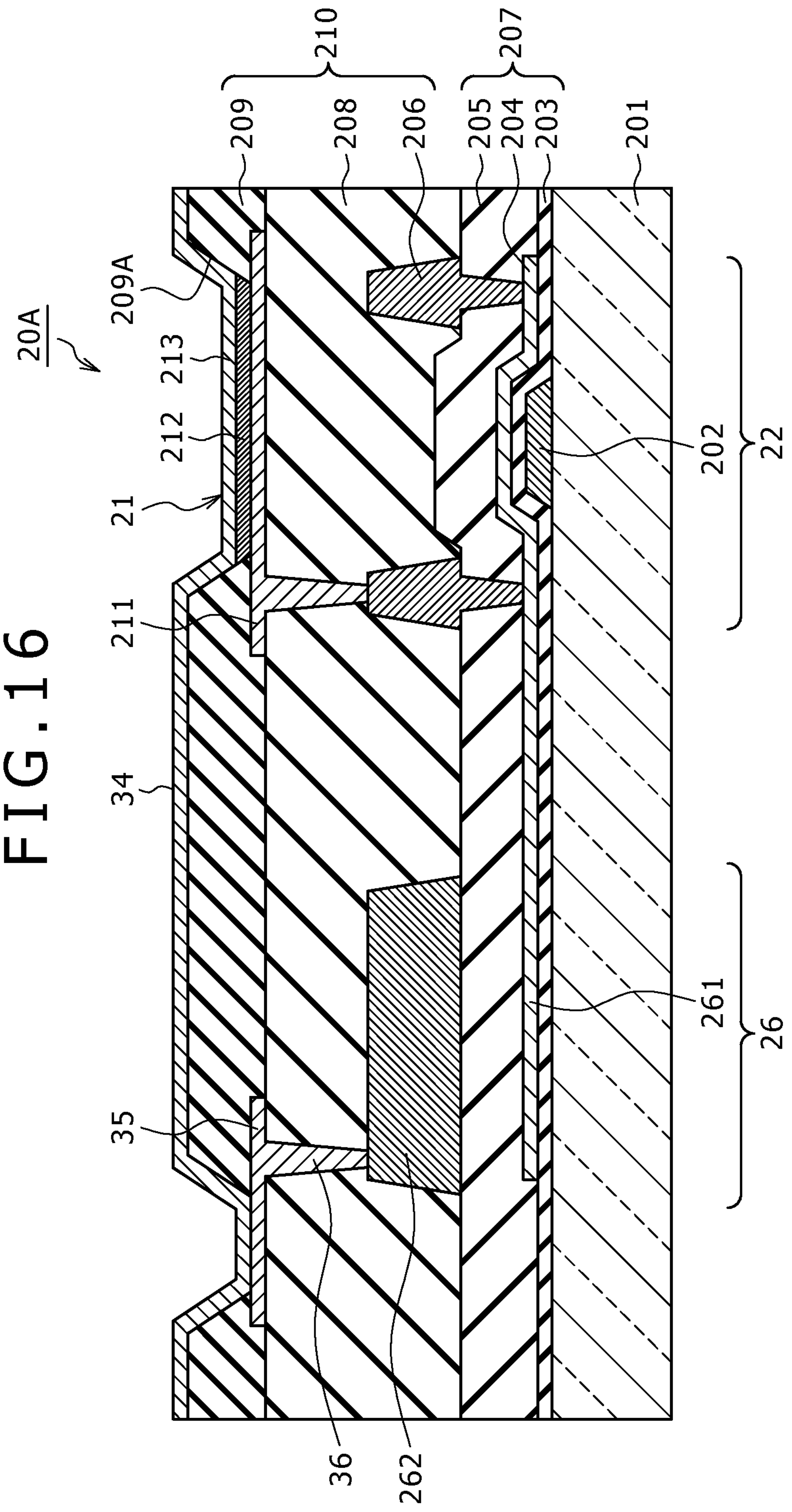
FIG. 16 is a sectional view illustrating the sectional structure of the pixel according to example 1.

FIG. 16 is a sectional view illustrating the sectional structure of a pixel 20A according to example 1. The sectional view of FIG. 16 is a sectional view taken along line A-A of FIG. 15.

As illustrated in FIG. 16, the pixel 20A has the gate electrode of the drive transistor 22 formed on a glass substrate 201 as a first wiring 202. A gate insulating film 203 is formed on the first wiring 202. A semiconductor layer 204 is formed, for example, with polysilicon on the gate insulating film 203. The same layer 204 forms the source and drain regions of the drive transistor 22. The power supply line 32 is formed as a second wiring 206 above the semiconductor layer 204 via an interlayer insulating film 205.

Here, the layer which includes the first wiring 202, gate insulating film 203, semiconductor layer 204 and interlayer insulating film 205 serves as the TFT layer 207. Further, an insulating planarizing film 208 and window insulating film 209 are formed successively on the interlayer insulating film 205 and second wiring 206. The organic EL element 21 is formed in a concave portion 209A provided in the window insulating film 209.

The organic EL element 21 includes an anode electrode 211 made of a metal or other material formed on the bottom of the concave portion 209A of the window insulating film 209. The same element 21 further includes an organic layer (electron transporting layer, light-emitting layer and hole transporting/injection layer) 212 formed on the anode electrode 211. The same element 21 still further includes a cathode electrode 213 (common power supply line 34) made, for example, of a transparent conductive film formed on the organic layer 212 commonly for all the pixels. Here, the layer which includes the second wiring 206 and insulating planarizing film 208 serves as an anode layer 210.

In the organic EL element 21, the organic layer 212 is formed by depositing the electron transporting layer, light-emitting layer and hole transporting/injection layer (none of these layers are shown) successively on the anode electrode 211. As the organic EL element 21 is current-driven by the drive transistor 22 shown in FIG. 2, a current flows from the drive transistor 22 to the organic layer 212 via the anode electrode 211. This causes electrons and holes to recombine in the light-emitting layer of the organic layer 212, thus causing light to be emitted.

The pixel 20, which includes the organic EL element 21, drive transistor 22, write transistor 23 and holding capacitance 24, is basically structured as described above.

In this basic pixel structure, the auxiliary capacitance 26 of the pixel 20A according to example 1 has the following structure. That is, one of electrodes 261 is formed with the semiconductor layer 204 made of polysilicon which forms the source and drain regions of the drive transistor 22. Other electrode 262 is formed with the same metallic material and by the same process as for the second wiring 206 so that the other electrode 262 is opposed to the one of the electrodes 261 via the interlayer insulating film 205. The auxiliary capacitance 26 is formed between the opposed regions of the parallel plates of the electrodes 261 and 262.

Contact is established between the other electrode 262 of the auxiliary capacitance 26 and the auxiliary electrode 35 by the contact portion 36. This ensures electrical connection, for each pixel, between the other electrode 262 of the auxiliary capacitance 26 and the auxiliary electrodes 35 which are disposed, for example, in rows for the pixels arranged in a matrix form. As a result, a fixed potential is applied from the common power supply line 34 via the auxiliary electrodes 35.

As described above, the auxiliary capacitance 26 is formed with the electrodes 261 and 262. The one of the electrodes 261 is made of polysilicon as for the semiconductor layer 204 of the drive transistor 22. The other electrode 262 is made of the same metallic material as for the second wiring 206. The other electrode 262 is electrically connected, for each pixel, to the auxiliary electrodes 35 which are disposed, for example, in rows for the pixels arranged in a matrix form. This makes it possible to apply a fixed potential to the other electrode 262 of the auxiliary capacitance 26 without providing any cathode wiring in the TFT layer 207, thus allowing to form the auxiliary capacitance 26 for the fixed potential. As a result, problems such as horizontal crosstalk caused by the limited layout area of the pixel 20 or wiring resistance in the pixel 20 can be resolved.

In the case of example 1, the capacitance value of the auxiliary capacitance 26 is determined by the following, i.e., the area of the opposed regions of the parallel plates of the electrodes 261 and 262, the gap between the electrodes 261 and 262 (film thickness of the interlayer insulating film 205), and the specific inductive capacity of the insulator (interlayer insulating film 205 in this example) mediating between the electrodes 261 and 262.

Example 2

Figure 17:
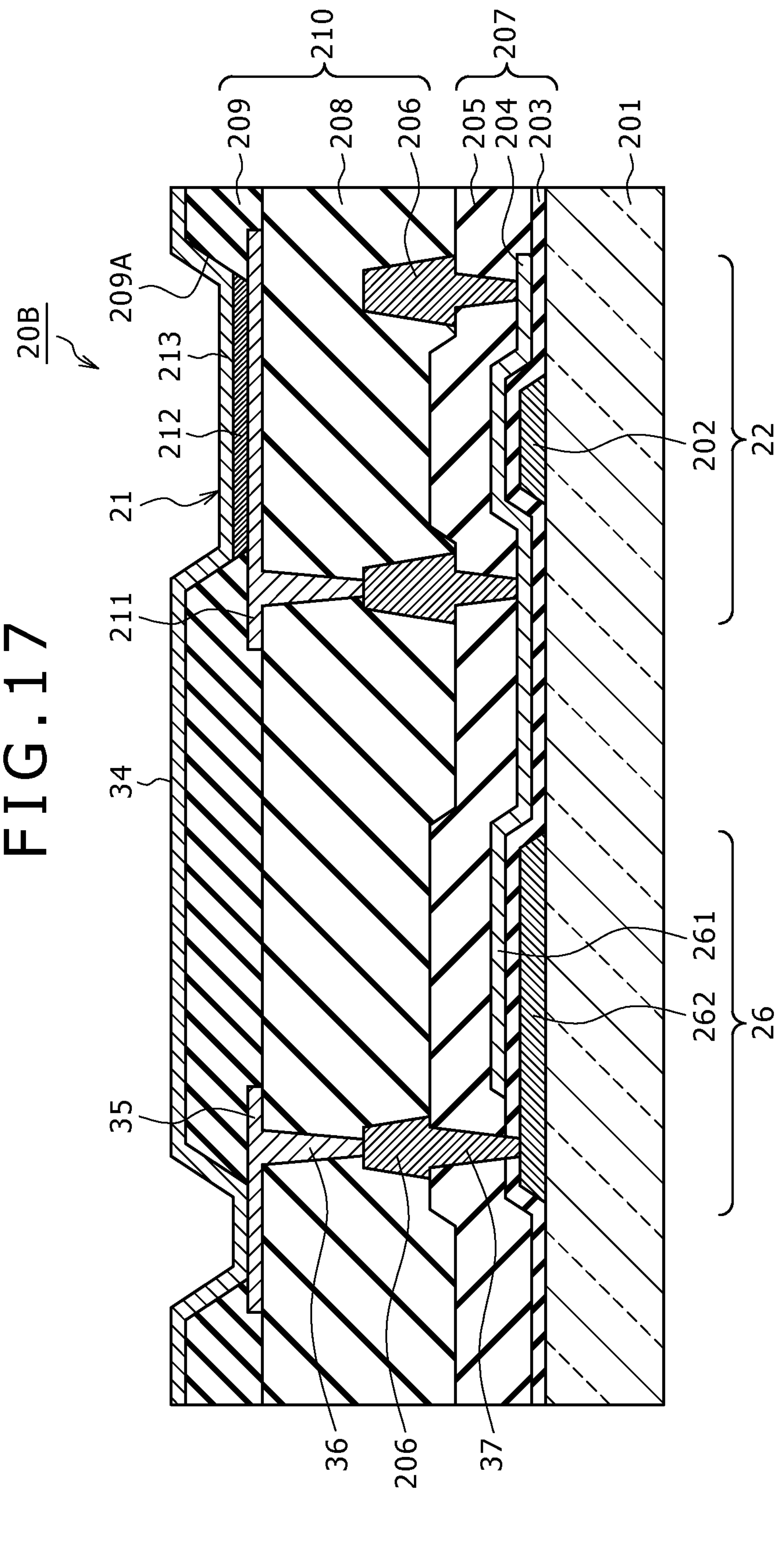
FIG. 17 is a sectional view illustrating the sectional structure of the pixel according to example 2.

FIG. 17 is a sectional view illustrating the sectional structure of a pixel 20B according to example 2. In FIG. 17, like components are designated by the same reference numerals as in FIG. 16. The sectional view of FIG. 17 is a sectional view taken along line A-A of FIG. 15.

The pixel 20B according to example 2 has the basic pixel structure as described in example 1. The auxiliary capacitance 26 of the pixel 20B has the following structure. That is, the other electrode 262 is formed first on the glass substrate 201 with the same metallic material and by the same process as for the first wiring 202. The one of the electrodes 261 is formed via the gate insulating film 203 with polysilicon which forms the semiconductor layer 204 of the drive transistor 22. The one of the electrodes 261 is formed where it is opposed to the electrode 262. The auxiliary capacitance 26 is formed between the opposed regions of the parallel plates of the electrodes 261 and 262.

Contact is established between the other electrode 262 of the auxiliary capacitance 26 and the second wiring 206 by a contact portion 37. Contact is also established between the other electrode 262 of the auxiliary capacitance 26 and the auxiliary electrode 35 by the contact portion 36. This ensures electrical connection, for each pixel, between the other electrode 262 of the auxiliary capacitance 26 and the auxiliary electrodes 35 which are disposed, for example, in rows for the pixels arranged in a matrix form. As a result, a fixed potential is applied from the common power supply line 34 via the auxiliary electrodes 35.

As described above, the auxiliary capacitance 26 is formed with the electrodes 261 and 262. The other electrode 262 is made of the same metallic material as for the first wiring 202. The one of the electrodes 261 is made of polysilicon as for the semiconductor layer 204 of the drive transistor 22. The other electrode 262 is electrically connected, for each pixel, to the auxiliary electrodes 35 which are disposed, for example, in rows for the pixels arranged in a matrix form. This makes it possible to apply a fixed potential to the other electrode 262 of the auxiliary capacitance 26 without providing any cathode wiring in the TFT layer 207, thus allowing to form the auxiliary capacitance 26 for the fixed potential. As a result, problems such as horizontal crosstalk caused by the limited layout area of the pixel 20 or wiring resistance in the pixel 20 can be resolved.

In the case of example 2, the capacitance value of the auxiliary capacitance 26 is determined by the following, i.e., the area of the opposed regions of the parallel plates of the electrodes 261 and 262, the gap between the electrodes 261 and 262 (film thickness of the gate insulating film 203), and the specific inductive capacity of the insulator (gate insulating film 203 in this example) mediating between the electrodes 261 and 262.

Here, examples 1 and 2 are compared. Assuming that both the specific inductive capacity and area of the opposed regions of the parallel plates are the same, the following can be said. That is, the gate insulating film 203 is typically thinner than the interlayer insulating film 205. Therefore, the gap between the parallel plates can be made smaller in example 2 than in example 1. As a result, the capacitance value of the auxiliary capacitance 26 can be set larger in example 2 than in example 1.

Conversely, example 1 has an advantage over example 2 in that leak caused by interlayer shorting is less likely to occur because the interlayer insulating film 205 is thicker than the gate insulating film 203.

Example 3

Figure 18:
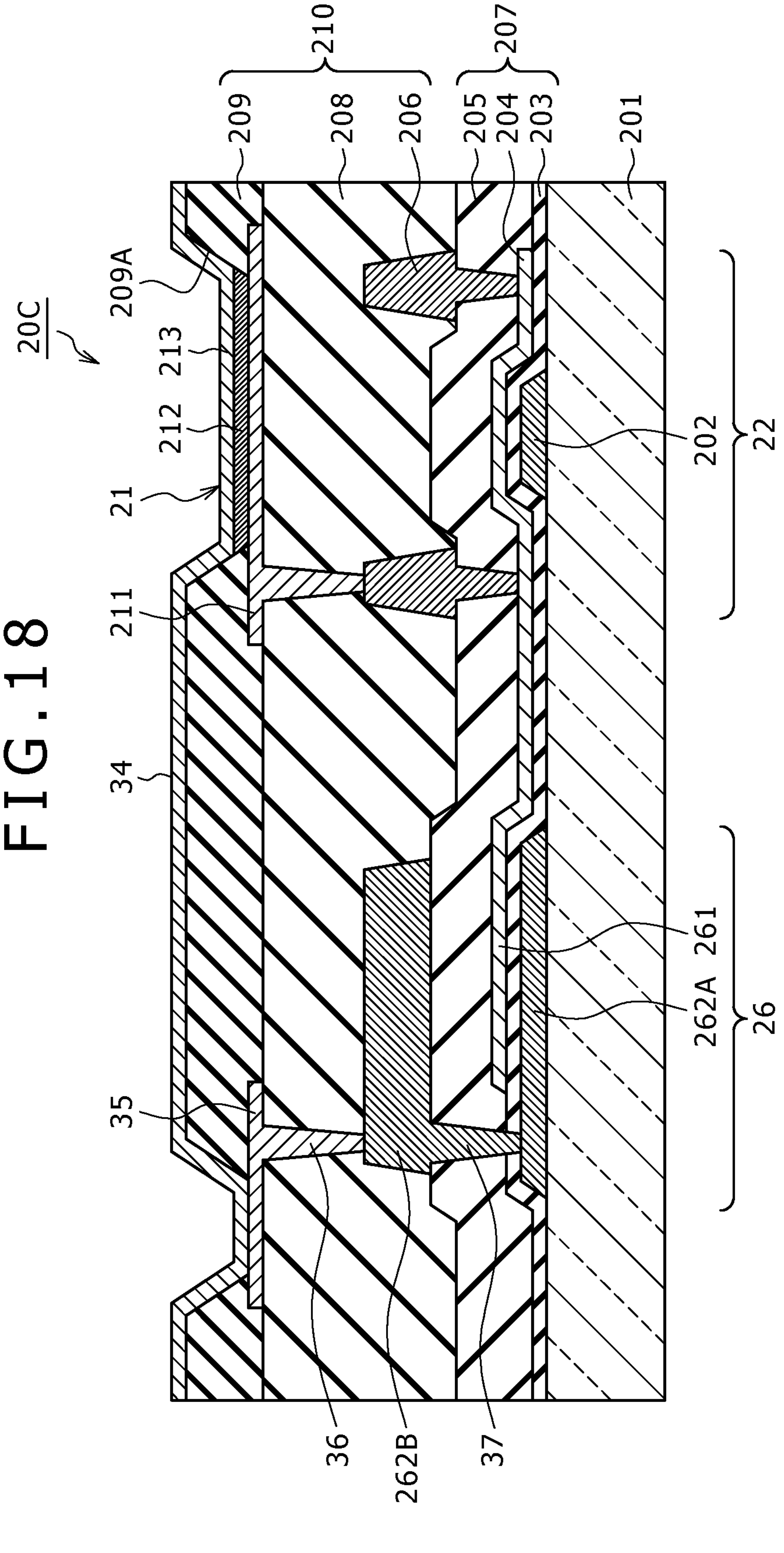
FIG. 18 is a sectional view illustrating the sectional structure of the pixel according to example 3.

FIG. 18 is a sectional view illustrating the sectional structure of a pixel 20C according to example 3. In FIG. 18, like components are designated by the same reference numerals as in FIGS. 16 and 17. The sectional view of FIG. 18 is a sectional view taken along line A-A of FIG. 15.

The pixel 20C according to example 3 has the basic pixel structure as described in example 1. The auxiliary capacitance 26 of the pixel 20C has the following structure. That is, an other first electrode 262A is formed first on the glass substrate 201 with the same metallic material and by the same process as for the first wiring 202. The one of the electrodes 261 is formed via the gate insulating film 203 with polysilicon which forms the semiconductor layer 204 of the drive transistor 22. The one of the electrodes 261 is formed where it is opposed to the electrode 262. Further, an other second electrode 262B is formed with the same metallic material and by the same process as for the second wiring 206 so that it is opposed to the electrode 261 via the interlayer insulating film 205. The auxiliary capacitance 26 is formed electrically in parallel between the opposed regions of the parallel plates of the electrodes 262A, 261 and 262B.

Contact is established between the other first electrode 262A of the auxiliary capacitance 26 and the other second electrode 262B by the contact portion 37. Contact is also established between the other first electrode 262A of the auxiliary capacitance 26 and the auxiliary electrode 35 by the contact portion 36. This ensures electrical connection, for each pixel, between the other first and second electrodes 262A and 262B of the auxiliary capacitance 26 and the auxiliary electrodes 35 which are disposed, for example, in rows for the pixels arranged in a matrix form. As a result, a fixed potential is applied from the common power supply line 34 via the auxiliary electrodes 35. Further, the capacitance formed between the electrodes 262A and 261 and that formed between the electrodes 262B and 261 are connected electrically in parallel so that the auxiliary capacitance 26 is formed as the combined capacitance of the two capacitances.

As described above, the auxiliary capacitance 26 is formed with the other electrodes 262A and 262B and one of electrodes 261. The other electrodes 262A and 262B are respectively made of the same metallic materials as for the first and second wirings 202 and 206. The one of electrodes 261 is made of polysilicon as for the semiconductor layer 204 of the drive transistor 22. The other electrodes 262A and 262B are electrically connected, for each pixel, to the auxiliary electrodes 35 which are disposed, for example, in rows for the pixels arranged in a matrix form. This makes it possible to apply a fixed potential to the other electrodes 262A and 262B of the auxiliary capacitance 26 without providing any cathode wiring in the TFT layer 207, thus allowing to form the auxiliary capacitance 26 for the fixed potential. As a result, problems such as horizontal crosstalk caused by the limited layout area of the pixel 20 or wiring resistance in the pixel 20 can be resolved.

In particular, a capacitance is formed between the other first electrode 262A and one of the electrodes 261 and another between the one of the electrodes 261 and other second electrode 262B. Therefore, assuming that the capacitance values in examples 1 and 2 are the same, the auxiliary capacitance 26 having a capacitance value roughly twice as large as that in examples 1 and 2 can be formed. In other words, if the auxiliary capacitance 26 need merely have more or less the same capacitance value as in examples 1 and 2, the electrodes 261, 262A and 262B forming the auxiliary capacitance 26 can be reduced in size. As a result, the auxiliary capacitance 26 can be formed in the pixel 20 without increasing the size of the pixel 20C as compared to examples 1 and 2.

In the case of example 3, the capacitance value of the auxiliary capacitance 26 is determined by the combined capacitance value of the two capacitances. One of the capacitances is determined by the area of the opposed regions of the parallel plates of the one of the electrodes 261 and other first electrode 262A, the distance between the electrodes 261 and 262A, and the specific inductive capacity of the insulator (gate insulating film 203 in this example) mediating between the electrodes 261 and 262A. The other capacitance is determined by the area of the opposed regions of the parallel plates of the one of the electrodes 261 and other second electrode 262B, the distance between the electrodes 261 and 262B, and the specific inductive capacity of the insulator (interlayer insulating film 205 in this example) mediating between the electrodes 261 and 262B.

Advantageous Effects of the Present Embodiment

As described above, the pixels 20 of the organic EL display device each have the auxiliary capacitance 26 to secure a sufficient write gain of the video signal. In this organic EL display device, the other electrode or electrodes 262 (262A and 262B) of the auxiliary capacitance 26 are connected, for each of the pixels 20, to the auxiliary electrodes 35 which are disposed in rows, in columns or in a grid form for the pixels arranged in a matrix form and which are applied with a fixed potential. This makes it possible to apply a fixed potential to the other electrodes 262 without providing any cathode wiring in the TFT layer 207, thus allowing to form the auxiliary capacitance 26 for the fixed potential while at the same time suppressing the wiring resistance. As a result, horizontal crosstalk caused by the wiring resistance can be suppressed, thus providing improved on-screen image quality.

In the above embodiment, a description was given taking, as an example, the case in which the present invention was applied to an organic EL display device using organic EL elements as electro-optical elements of the pixel circuits. However, the embodiment of the present invention is not limited to this application example, but applicable to display devices in general using current-driven electro-optical elements (light-emitting elements) whose light emission brightness changes with change in current flowing through the elements.

Application Examples

The display device according to the embodiment of the present invention described above is applicable as a display device of electronic equipment across all fields including those shown in FIGS. 19 to 23, namely, a digital camera, laptop personal computer, mobile terminal device such as mobile phone and video camcorder. These pieces of equipment are designed to display an image or video of a video signal fed to or generated inside the electronic equipment.

As described above, if used as a display device of electronic equipment across all fields, the display device according to the embodiment of the present invention can, as is clear from the aforementioned embodiment, prevent horizontal crosstalk caused by the wiring resistance because contact is established, for each of the pixels 20, between the other electrode of the auxiliary capacitance 26 and the auxiliary electrodes 35 which are disposed in rows, in columns or in a grid form for the pixels arranged in a matrix form. As a result, the display device according to the embodiment of the present invention provides excellent on-screen image quality in all kinds of electronic equipment.

It should be noted that the display device according to the embodiment of the present invention includes that in a modular form having a sealed configuration. Such a display device corresponds to a display module formed by attaching an opposed section made, for example, of transparent glass to the pixel array section 30. The aforementioned light-shielding film may be provided on the transparent opposed section, in addition to films such as color filter and protective film. It should also be noted that a circuit section, FPC (flexible printed circuit) or other circuitry, adapted to allow exchange of signals or other information between external equipment and the pixel array section, may be provided on the display module.

Specific examples of electronic equipment to which the embodiment of the present invention is applied will be described below.

Figure 19:
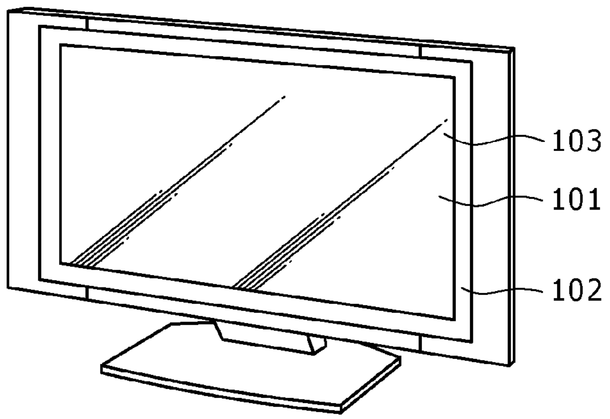
FIG. 19 is a perspective view illustrating the appearance of a television set to which the embodiment of the present invention is applied.

FIG. 19 is a perspective view illustrating a television set to which the embodiment of the present invention is applied. The television set according to the present application example includes a video display screen section 101 made up, for example, of a front panel 102, filter glass 103 and other parts. The television set is manufactured by using the display device according to the embodiment of the present invention as the video display screen section 101.

Figure 20A:
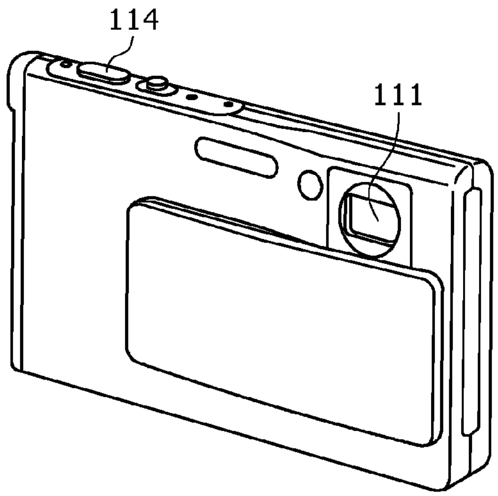
FIGS. 20A and 20B are perspective views illustrating the appearance of a digital camera to which the embodiment of the present invention is applied.
Figure 20B:
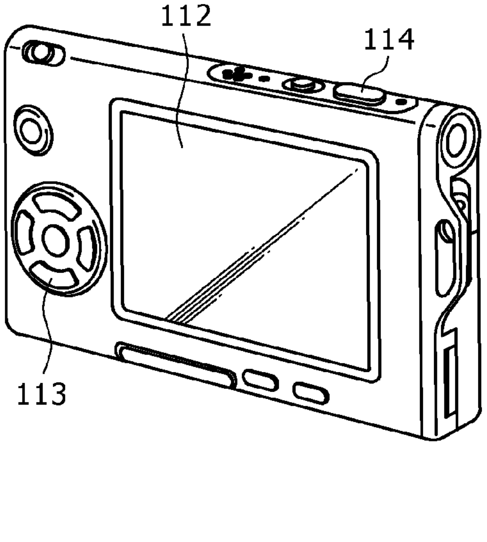

FIGS. 20A and 20B are perspective views illustrating a digital camera to which the embodiment of the present invention is applied. FIG. 20A is a perspective view of the digital camera as seen from the front, and FIG. 20B is a perspective view thereof as seen from the rear. The digital camera according to the present application example includes a flash-emitting section 111, display section 112, menu switch 113, shutter button 114 and other parts. The digital camera is manufactured by using the display device according to the embodiment of the present invention as the display section 112.

Figure 21:
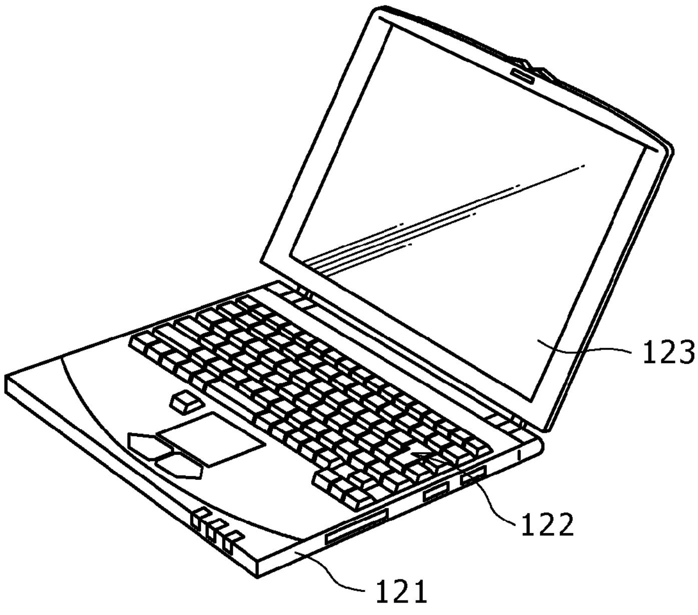
FIG. 21 is a perspective view illustrating the appearance of a laptop personal computer to which the embodiment of the present invention is applied.

FIG. 21 is a perspective view illustrating a laptop personal computer to which the embodiment of the present invention is applied. The laptop personal computer according to the present application example includes, in a main body 121, a keyboard 122 adapted to be manipulated for entry of text or other information, a display section 123 adapted to display an image, and other parts. The laptop personal computer is manufactured by using the display device according to the embodiment of the present invention as the display section 123.

Figure 22:
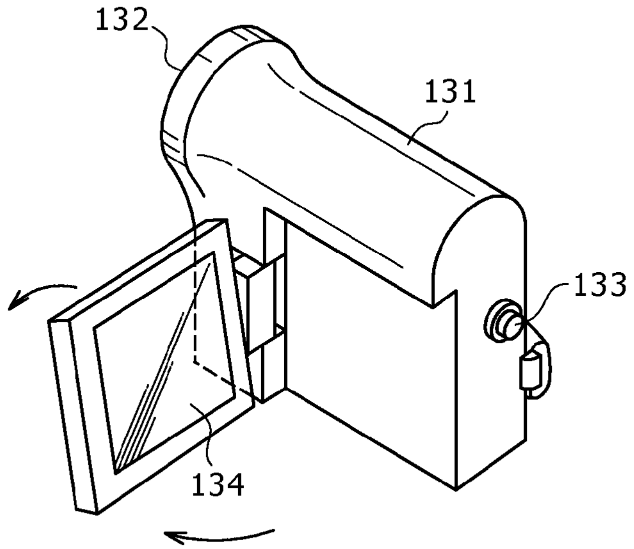
FIG. 22 is a perspective view illustrating the appearance of a video camcorder to which the embodiment of the present invention is applied.

FIG. 22 is a perspective view illustrating a video camcorder to which the embodiment of the present invention is applied. The video camcorder according to the present application example includes a main body section 131, lens 132 provided on the front-facing side surface to image the subject, imaging start/stop switch 133, display section 134 and other parts. The video camcorder is manufactured by using the display device according to the embodiment of the present invention as the display section 134.

Figures 23A, 23B, 23C, 23D, 23E, 23F, 23G:
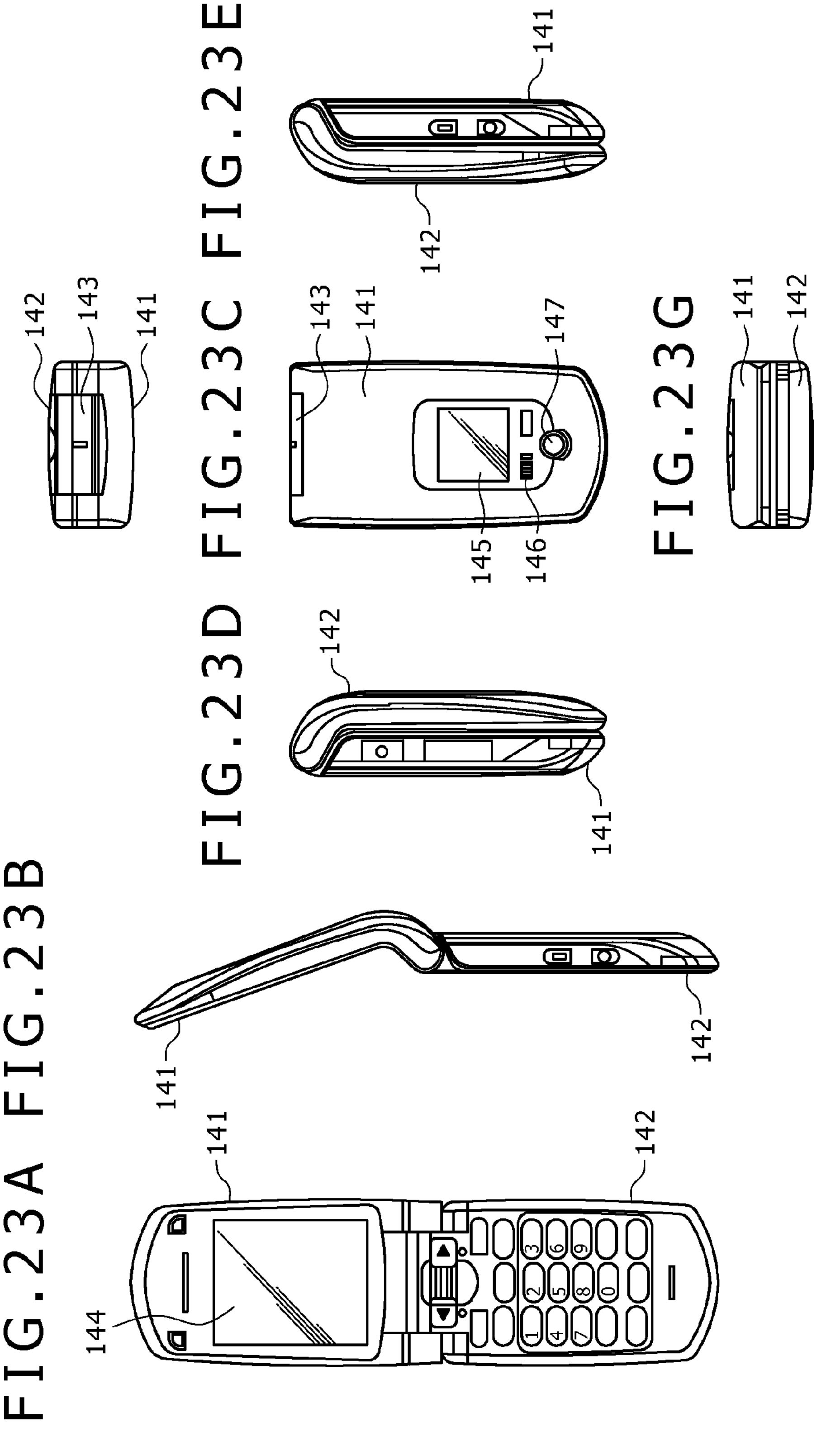
FIGS. 23A to 23G are external views illustrating a mobile phone to which the embodiment of the present invention is applied.

FIGS. 23A to 23G are perspective views illustrating a mobile terminal device such as mobile phone to which the embodiment of the present invention is applied. FIG. 23A is a front view of the mobile phone in an open position. FIG. 23B is a side view thereof. FIG. 23C is a front view of the mobile phone in a closed position. FIG. 23D is a left side view. FIG. 23E is a right side view. FIG. 23F is a top view. FIG. 23G is a bottom view. The mobile phone according to the present application example includes an upper enclosure 141, lower enclosure 142, connecting section (hinge section in this example) 143, display 144, subdisplay 145, picture light 146, camera 147 and other parts. The mobile phone is manufactured by using the display device according to the embodiment of the present invention as the display 144 and subdisplay 145.

It should be understood by those skilled in the art that various modifications, combinations, sub-combinations and alterations may occur depending on design requirements and other factor in so far as they are within the scope of the appended claims or the equivalents thereof.

What is claimed is:

1. A display device comprising a pixel array section, the pixel array section having pixels arranged in a matrix, each of the pixels including (a) an electro-optical element, (b) a write transistor configured to provide a video signal, (c) a holding capacitor, and (d) a drive transistor configured to drive the electro-optical element based on the video signal, wherein:

each pixel has an auxiliary electrode, each pixel has an auxiliary capacitor, for each pixel, a first electrode of the auxiliary capacitor is connected to the drive transistor and a second electrode of the auxiliary capacitor is connected to the auxiliary electrode, for each pixel, the second electrode of the auxiliary capacitor is formed beneath the first electrode of the auxiliary capacitor as viewed in cross section, for each pixel, the second electrode of the auxiliary capacitor is connected to the auxiliary electrode via a second wiring formed in a layer in which a power supply line is formed, for each pixel, the second electrode of the auxiliary capacitor and the second wiring are made of the same metallic material, and for each pixel, the second electrode of the auxiliary capacitor comprises a third electrode and a fourth electrode electrically connected to each other, the third electrode is in a wiring layer in which gate electrode of the drive transistor is located such that the third electrode is opposed to the first electrode of the auxiliary capacitor via a gate insulating film therebetween, and the fourth electrode is in a wiring layer in which the power supply lines are located such that the fourth electrode is opposed to the first electrode of the auxiliary capacitor with an interlayer insulating film therebetween.

2. The display device of claim 1, wherein: the second electrode of the auxiliary capacitor is connected to the second wiring via a first contact portion, the second wiring is connected to the auxiliary electrode via a second contact portion, and the first contact portion and the second contact portion are overlapped.

3. The display device of claim 1, wherein: the second electrode of the auxiliary capacitor is in a wiring layer in which the power supply lines are located; and the second electrode of the auxiliary capacitor is opposed to the first electrode of the auxiliary capacitor with an interlayer insulating film therebetween.

4. The display device of claim 1, wherein: the second electrode of the auxiliary capacitor is in a wiring in which a gate electrode of the drive transistor is located, and the second electrode of the auxiliary capacitor is opposed to the first electrode of the auxiliary capacitor with a gate insulating film therebetween.

5. An electronic apparatus having a display device according to claim 1.

6. A display device comprising a pixel array section, the pixel array section having pixels arranged in a matrix, each of the pixels including (a) an electro-optical element; (b) a first transistor configured to provide a video signal; and (c) a second transistor configured to flow a current from a power supply line to the electro-optical element, wherein, for each pixel:

the pixel has a capacitor, a first electrode of the capacitor is connected to a source terminal of the second transistor, a second electrode of the capacitor is connected to a wiring, the wiring is configured to apply a potential to the second electrode of the capacitor, the second electrode of the capacitor is formed beneath the first electrode of the capacitor, the second electrode of the capacitor is connected to the wiring via a second wiring formed in a layer in which a power supply line is formed, the second transistor is connected to the anode electrode via a third wiring, and the power supply line, the second wiring, and the third wiring are formed in the same layer.

7. The display device of claim 6, wherein the electro-optical element includes an anode electrode and a cathode electrode, and the wiring and the anode electrode are formed in the same layer.

8. The display device of claim 6, wherein the wiring is arranged in each row of the pixels.

* * * * *